(12) United States Patent  
Son et al.

(10) Patent No.: US 9,075,269 B2  
(45) Date of Patent: Jul. 7, 2015

(54) ARRAY SUBSTRATE AND LIQUID CRYSTAL DISPLAY DEVICE INCLUDING THE SAME

(71) Applicant: LG Display Co., Ltd., Seoul (KR)

(72) Inventors: Kyung-Mo Son, Gyeonggi-do (KR);
Jae-Kyun Lee, Gyeonggi-do (KR);
Sung-Chol Yi, Gyeonggi-do (KR);
Taek-Jun Jung, Gyeonggi-do (KR);
Sun-Ju Ku, Gyeonggi-do (KR);
Soon-Hwan Hong, Seoul (KR);
Sang-Su Jang, Gyeonggi-do (KR);
Jun-Young Jeong, Gyeonggi-do (KR);
Eun-Hye Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 54 days.

(21) Appl. No.: 14/080,809

(22) Filed: Nov. 15, 2013

(65) Prior Publication Data

US 2014/0168554 A1 Jun. 19, 2014

(30) Foreign Application Priority Data

Dec. 17, 2012 (KR) .......................... 10-2012-0147453

(51) Int. Cl.
*G02F 1/13* (2006.01)
*G02F 1/1343* (2006.01)
*G02F 1/1339* (2006.01)

(52) U.S. Cl.
CPC ....... *G02F 1/134336* (2013.01); *G02F 1/13394* (2013.01); *G02F 1/134309* (2013.01); *G02F 2001/13396* (2013.01)

(58) Field of Classification Search
CPC .................... G02F 1/134363; G02F 1/133707; G02F 1/34327; G02F 1/134309
See application file for complete search history.

(56) References Cited

U.S. PATENT DOCUMENTS 7,705,946 B2 * 4/2010 Hirota ........................... 349/141

\* cited by examiner

*Primary Examiner* — Phu Vu
(74) *Attorney, Agent, or Firm* — Morgan, Lewis & Bockius LLP

(57) ABSTRACT

An array substrate includes a substrate; gate lines over the substrate along a first direction; data lines over the substrate along a second direction and crossing the gate lines to define pixel regions; a thin film transistor at each crossing portion of the gate and data lines; an insulating layer covering the thin film transistor and having a flat top surface; a common electrode on the insulating layer all over the substrate; a common line on the common electrode; a passivation layer on the common line; and a pixel electrode on the passivation layer in each pixel region and connected to the thin film transistor, the pixel electrode including electrode patterns, wherein the passivation layer has a step height at a top surface of the passivation layer due to the plurality of common lines.

29 Claims, 19 Drawing Sheets

ARRAY SUBSTRATE AND LIQUID CRYSTAL DISPLAY DEVICE INCLUDING THE SAME

The present application claims the priority benefit of Korean Patent Application No. 10-2012-0147453 filed in the Republic of Korea on Dec. 17, 2012, which is hereby incorporated by reference in their entirety.

BACKGROUND

1. Field of the Disclosure

The present disclosure relates to a liquid crystal display device, and more particularly, to an array substrate where problems due to shifts of column spacers are prevented and a liquid crystal display device including the same.

2. Discussion of the Related Art

A liquid crystal display device has been widely used in various electronics, such as a notebook, a monitor, a TV, etc., since it has a high contrast ratio, is suitable to display moving images, and has low consumption power. Liquid crystal has optical anisotropy in which its molecular structure is thin and long and its molecular arrangement has directivity, and has polarization in which the direction of its molecular arrangement changes according to the magnitude of an electric field when the liquid crystal is in the electric field. The liquid crystal display device displays images using the optical anisotropy and polarization of liquid crystal.

In general, a liquid crystal display device includes a liquid crystal panel fabricated by bonding first and second substrates with a liquid crystal layer therebetween, and electrodes are formed on the facing surfaces of the first and second substrates so that the arrangement of liquid crystal molecules depends on an electric field applied to the electrodes to thereby make a difference in transmittance.

The difference in transmittance of the liquid crystal panel is reflected in a combined color when light emitted from a backlight positioned on the rear side of the liquid crystal panel passes through a color filter, thereby representing a color image.

A method of fabricating a liquid crystal display device includes a substrate fabricating process of forming an array substrate and a color filter substrate, a cell process of fabricating a liquid crystal panel, and a module process of integrating the liquid crystal panel with a backlight.

In the substrate fabricating process, steps of thin film deposition, photolithography, etching, etc., are repeatedly performed to form an array layer and a color filter layer on the respective substrates. In the cell process, a seal pattern for bonding is formed on one of the array substrate and the color filter substrate, and the array substrate is bonded to the color filter substrate with the liquid crystal layer interposed therebetween to thereby fabricate the liquid crystal panel. In the module process, a polarizer, a driving circuit, etc. are attached onto the liquid crystal panel and then the liquid crystal panel is integrated with the backlight to thereby complete a liquid crystal display device.

Meanwhile, spacers are provided between the array substrate and the color filter substrate in order to maintain a constant distance between the array substrate and the color filter substrate. The spacers are classified into ball spacers and column spacers according to their shapes and arrangement. The ball spacers are formed in such a manner to be distributed on the array substrate or the color filter substrate, and the column spacers are formed through patterning on the array substrate or the color filter substrate.

Recently, column spacers have been widely used since they can be easily formed in a desired pattern at a specific location, and the column spacers are formed generally on a color filter substrate requiring a relatively small number of processes.

However, when an external force is applied to a liquid crystal panel, column spacers move, which damages an alignment layer and causes defects. This will be described in detail with reference to a drawing.

FIG. 1 is a cross-sectional view of a related art liquid crystal display device.

In FIG. 1, a first substrate 10 and a second substrate 20 are spaced apart from and faces each other with a distance therebetween, and an aperture area AA in which an image is displayed and a shielding area SA in which no image is displayed are defined on the first substrate 10 and the second substrate 20.

On an inner surface of the first substrate 10 facing the second substrate 20, a signal line 12, such as a gate line or a data line, is formed in correspondence to the shielding area SA, an insulating layer 14 is formed on the signal line 12, and a first alignment layer 16 is formed on the insulating layer 14. Although not shown in FIG. 1, a pixel electrode is formed in the aperture area AA on the first substrate 10.

On an inner surface of the second substrate 20 facing the first substrate 10, a black matrix 22 is formed, a color filter layer 24 is formed on the black matrix 22, and a second alignment layer 26 is formed on the color filter layer 24. Although not shown in FIG. 1, a common electrode is formed on the entire surface of the second substrate 20. Also, a column spacer 32 is formed on the second alignment layer 26, in correspondence to the black matrix 22, such that at least one column spacer 32 is formed for each pixel.

Meanwhile, a liquid crystal layer (not shown) is positioned between the first alignment layer 16 and the second alignment layer 26.

FIGS. 2A and 2B are cross-sectional views of the related art liquid crystal display device when an external force is applied to the related art liquid crystal display device and when the applied external force is removed.

In FIG. 2A, when an external force is applied to the related art liquid crystal display device in the direction of an arrow shown in FIG. 2A, the second substrate 20 moves to the right with respect to the first substrate 10. At this time, the column spacer 32 on the second substrate 20 also moves to the right, so that the column spacer 32 contacts the first alignment layer 16 of the aperture area AA. The first and second alignment layers 16 and 26 are rubbed or optically aligned in a predetermined direction, and due to the contact with the column spacer 32, the alignment of the first alignment layer 16 changes at a contact area A1 so that the contact area A1 has different alignment from the other area.

Successively, in FIG. 2B, when the external force is removed, the second substrate 20 moves to the left with respect to the first substrate 10 to return to its original state. However, since the contact area A1 of the first alignment layer 16 has a different alignment from the other area, liquid crystal molecules over the contact area A1 are aligned differently from liquid crystal molecules over the other area to thereby change transmittance of light. However, since the contact area A1 is not covered by the black matrix 22, light is transmitted in correspondence to the contact area A1 when a black image is displayed, resulting in a recognizable defect.

A structure for preventing such a defect is shown in FIG. 3.

FIG. 3 is a cross-sectional view of another related art liquid crystal display device. The structure shown in FIG. 3 is the same as that shown in FIG. 1, except for the structure of the black matrix. In the following description, the same elements as those described above will not be described.

In FIG. 3, a width of each black matrix 22 increases to a predetermined size such that the black matrix 22 covers the contact area A1 of the first alignment layer 16. In detail, the width of the black matrix 22 increases to a predetermined size in which the black matrix 22 extends to about 22 to 25 micrometers from both top edges of the column spacer 32 contacting the first alignment layer 16. That is, the width of the black matrix 22 increases by about 15 micrometers or more, compared to the black matrix 22 of the example shown in FIG. 1.

However, the increased width of the black matrix 22 increases the shielding area SA to reduce the aperture areas AA, which lowers the aperture ratio and brightness of the liquid crystal display device.

SUMMARY OF THE INVENTION

Accordingly, the present invention is directed to an array substrate and a liquid crystal display device including the same that substantially obviates one or more of the problems due to limitations and disadvantages of the related art.

An object of the present disclosure is to provide an array substrate and a liquid crystal display device including the same that prevent problems caused by movements of column spacers and improve the aperture ratio and the brightness.

Another object of the present disclosure is to provide an array substrate and a liquid crystal display device including the same that block light leakage due to rubbing problems.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided an array substrate for a liquid crystal display device includes a substrate; gate lines over the substrate along a first direction; data lines over the substrate along a second direction and crossing the gate lines to define pixel regions; a thin film transistor at each crossing portion of the gate and data lines; an insulating layer covering the thin film transistor and having a flat top surface; a common electrode on the insulating layer all over the substrate; a common line on the common electrode; a passivation layer on the common line; and a pixel electrode on the passivation layer in each pixel region and connected to the thin film transistor, the pixel electrode including electrode patterns, wherein the passivation layer has a step height at a top surface of the passivation layer due to the plurality of common lines.

In another aspect, a liquid crystal display device includes a first substrate and a second substrate facing each other; wherein the first substrate comprises: a plurality of gate lines over the first substrate along a first direction; a plurality of data lines over the first substrate along a second direction and crossing the gate lines to define pixel regions; a thin film transistor at each crossing portion of the plurality of gate lines and the plurality of data lines; an insulating layer covering the thin film transistor and having a flat top surface; a common electrode on the insulating layer all over the first substrate; a plurality of common lines on the common electrode; a passivation layer on the common lines; and a pixel electrode on the passivation layer in each pixel region and connected to the thin film transistor, the pixel electrode including electrode patterns, wherein the passivation layer has a step height at a top surface of the passivation layer due to the plurality of common lines, wherein the second substrate comprises: a black matrix, a color filter layer, and an overcoat layer stacked up on the second substrate; a first spacer and a second spacer on the overcoat layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 4:
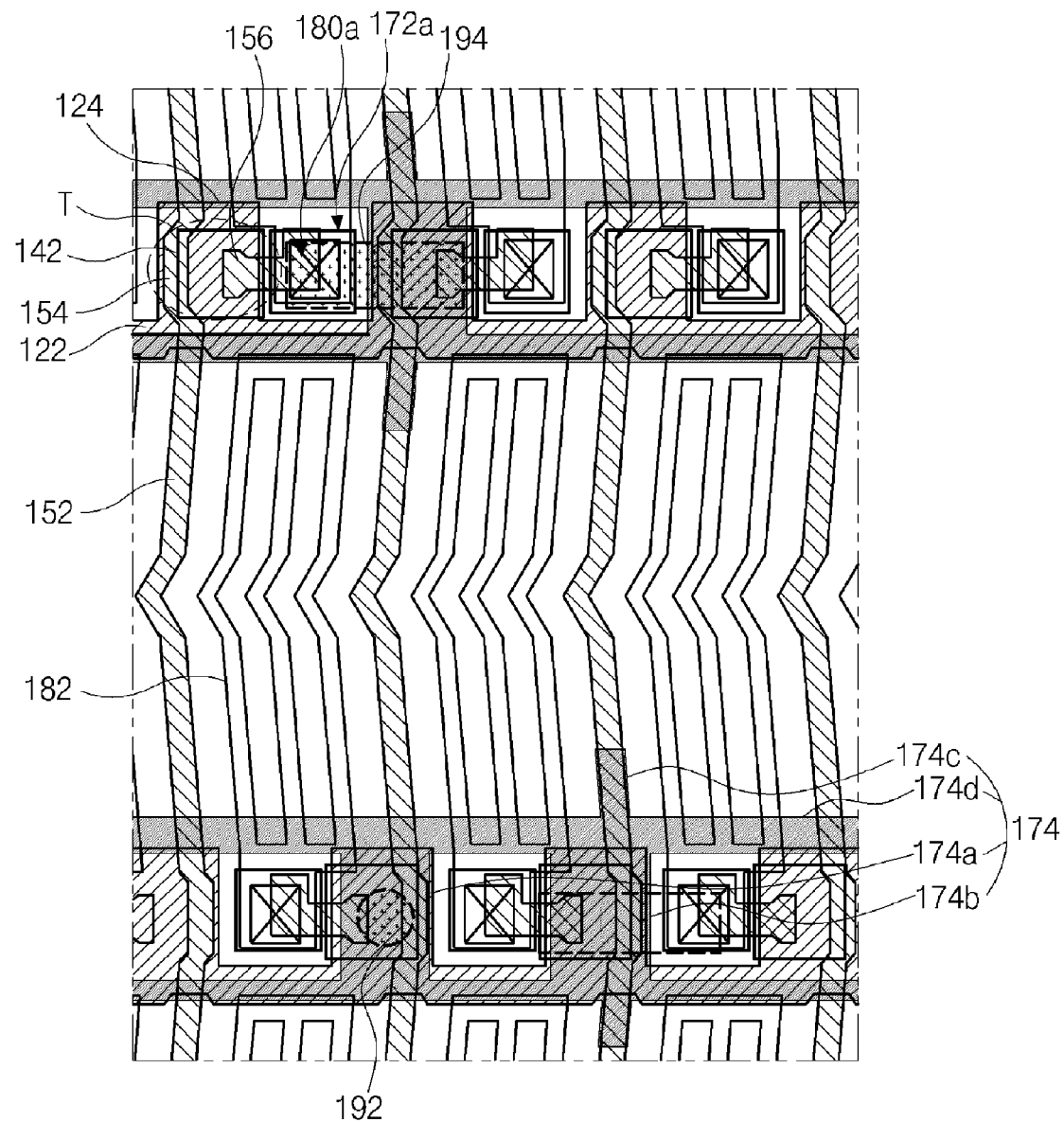
FIG. 4 is a plan view of an array substrate of a liquid crystal display device according to an embodiment of the present invention.

FIG. 4 is a plan view of an array substrate of a liquid crystal display device according to an embodiment of the present invention. For convenience of explanation, first and second column spacers which are formed on a color filter substrate are illustrated together.

In FIG. 4, gate lines 122 and gate electrodes 124 are formed on an insulating substrate (not shown). The gate lines 122 extend in a first direction, and the gate electrodes 124 are connected to the gate lines 122.

A gate insulating layer (not shown) is formed on the gate lines 122 and the gate electrodes 124.

Active layers 142 of amorphous silicon are formed on the gate insulating layer over the gate electrodes 124.

Data lines 152, source electrodes 154 and drain electrode 156 are formed on the gate insulating layer and the active layers 142. The data lines 152 extend in a second direction, the source electrodes 154 are connected to the data lines 152, and the drain electrodes 156 are spaced apart from the source electrodes 154. The data lines 152 cross the gate lines 122 to define pixel regions. The source and drain electrodes 154 and 156 are spaced apart from each other over the corresponding active layers 142.

In the current embodiment, parts of the data lines 152 are the source electrodes 154, but parts extending from the data lines 152 may become the source electrodes 154.

A gate electrode 124, an active layer 142, a source electrode 154, and a drain electrode 156 constitute a thin film transistor T, and the active layer 142 between the source electrode 154 and the drain electrode 156 becomes a channel of the thin film transistor T.

Figure 1:
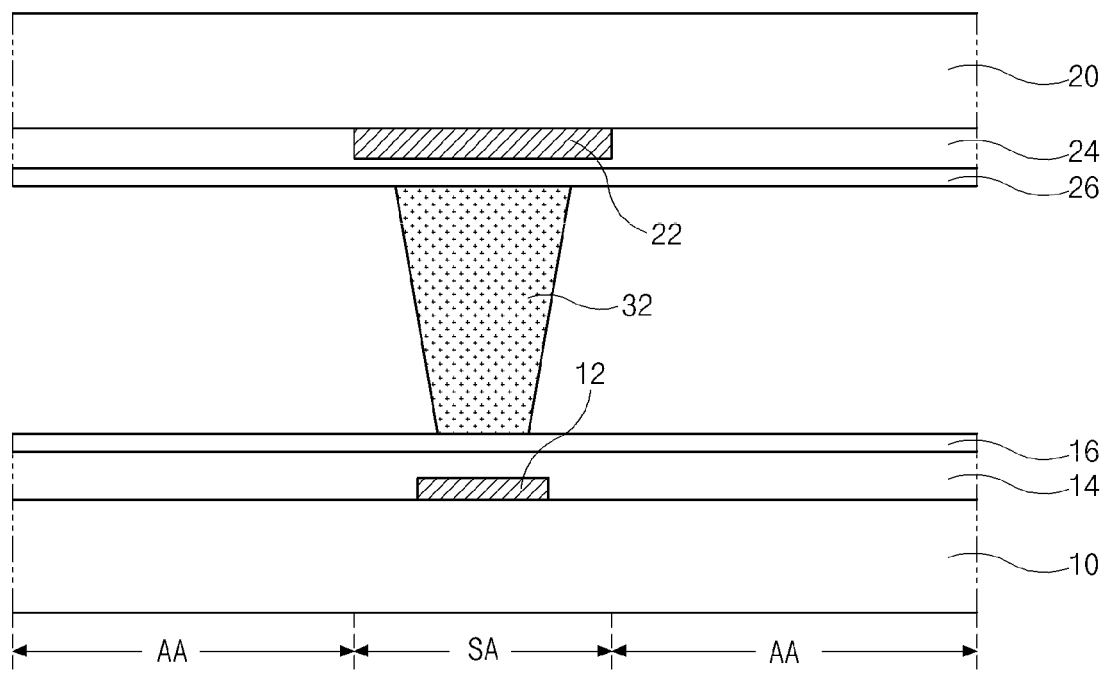
FIG. 1 is a cross-sectional view of a related art liquid crystal display device.
Figure 2A:
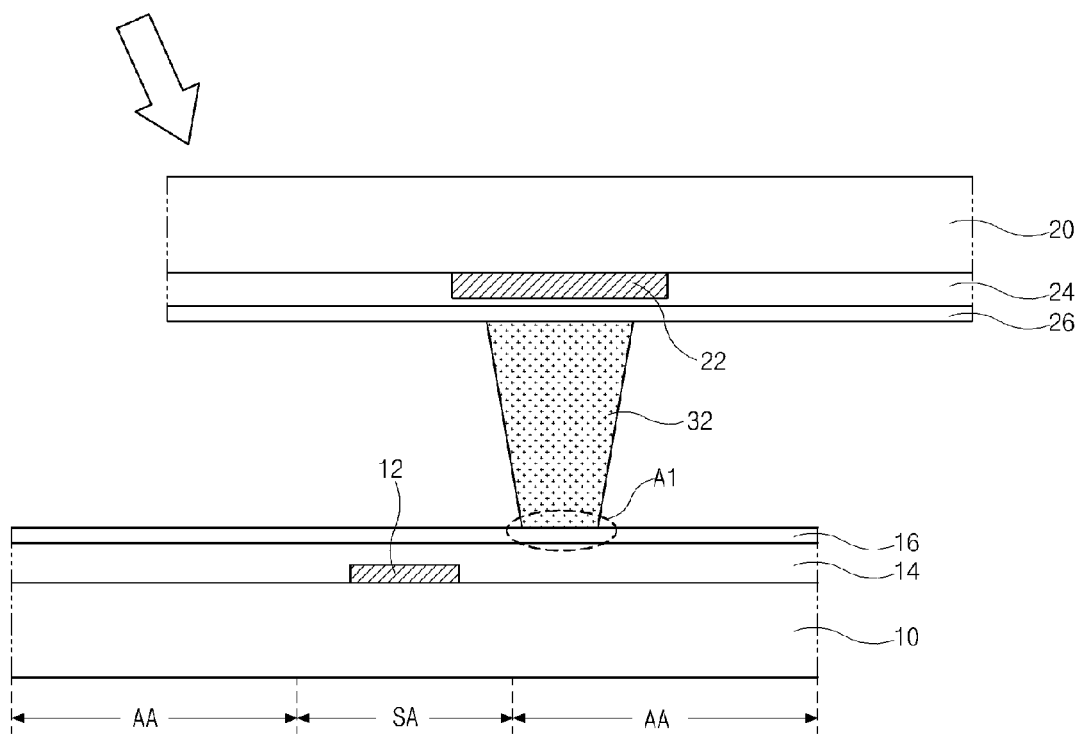
FIGS. 2A and 2B are cross-sectional views of the related art liquid crystal display device when an external force is applied to the related art liquid crystal display device and when the applied external force is removed.
Figure 2B:
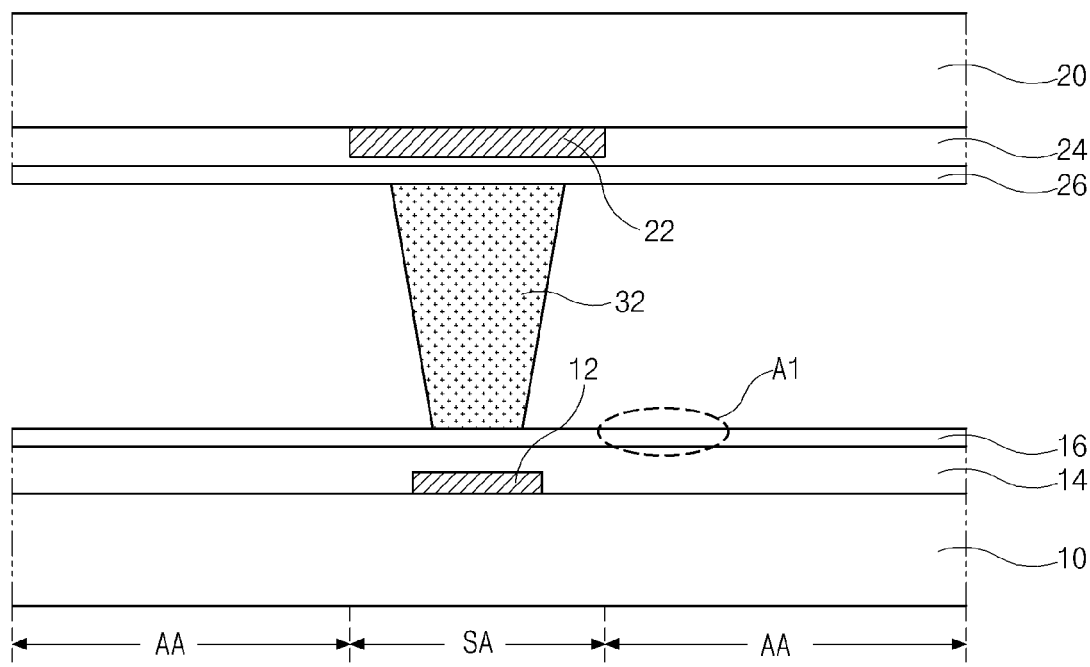
Figure 3:
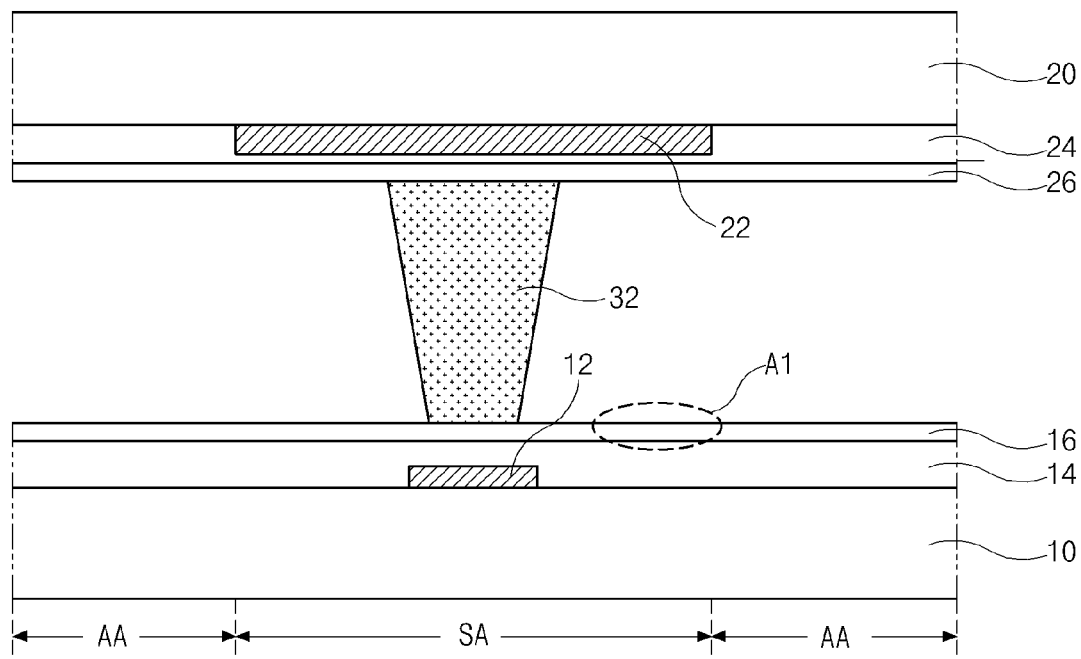
FIG. 3 is a cross-sectional view of another related art liquid crystal display device.

Here, the thin film transistor T is not limited to the structure shown in FIG. 1, and the structure of the thin film transistor T can be varied.

In the meantime, as shown in FIG. 4, the thin film transistors T connected to odd gate lines 122 are connected to the data line 152 of the left side, and the thin film transistors T connected to even gate lines 122 are connected to the data line 152 of the right side. Alternatively, the thin film transistors T connected to odd gate lines 122 may be connected to the data line 152 of the right side, and the thin film transistors T connected to even gate lines 122 may be connected to the data line 152 of the left side.

A first passivation layer (not shown) and a second passivation layer (not shown) are sequentially formed on the data lines 152, the source electrodes 154, and the drain electrodes 156. Here, the first passivation layer is formed of an inorganic insulating material, and the second passivation layer is formed of an organic insulating material and has a flat surface.

A common electrode (not shown) is formed on the second passivation layer. The common electrode is formed over the entire surface of the substrate and has openings 172a in correspondence to the drain electrodes 156 of the thin film transistors T.

Common lines 174 are formed on the common electrode and contact the common electrode. Each common line 174 includes first, second, third and fourth parts 174a, 174b, 174c and 174d. The first part 174a is disposed over one of the thin film transistors T and corresponds to a first column spacer 192. The second part 174b is disposed over another thin film transistor T and corresponds to a second column spacer 194. The third part 174c extends from each of both sides of the second part 174b along the second direction by a predetermined length and overlaps the data line 152. The fourth part 174d extends along the first direction. The fourth part 174d may include a first line pattern, which connects first ends of the first part 174a and the second part 174b, and a second line pattern, which is parallel to the first line pattern and connects second ends of the first part 174a and the second part 174b. The common lines 174 are formed of a metallic material having relatively low resistivity.

Here, the first column spacer 192 is a gap-forming spacer and has a circular shape in a flat structure. The second column spacer 194 is a press-preventing spacer and has a bar or rectangular shape in a flat structure. It is beneficial that a width and a length of the second column spacer 194 are larger than a diameter of the first column spacer 192.

The diameter of the first column spacer 192 is smaller than lengths of the first part 174a along the first and second directions, and edges of the first column spacer 192 are disposed within edges of the first part 174a. On the other hand, the length of the second column spacer 194 along the first direction is smaller than a length of the pixel region along the first direction and larger than a length of the second part 174b along the first direction.

A third passivation layer (not shown) is formed on the common lines 174. The third passivation layer is formed of an inorganic insulating material, such as silicon oxide or silicon nitride, and has a step height at its top surface due to the lower layer, that is, the common lines 174. Also, the third passivation layer has drain contact holes 180a to expose the drain electrodes 156 with the first passivation layer and the second passivation layer. Namely, the drain contact holes 180a are also formed in the first and second passivation layers. The drain contact holes 180a are disposed in the openings 172a, respectively.

A pixel electrode 182 is formed in each pixel region on the third passivation layer. The pixel electrode 182 includes a plurality of electrode patterns extending along the second direction and spaced apart from each other along the first direction. The pixel electrode 182 contacts the drain electrode 156 through the drain contact hole 180a in each pixel region.

The pixel electrode 182 is inclined with respect to the gate lines 122 with a predetermined angle and has at least one bent part at its center portion. As shown in FIG. 4, the pixel electrode 182 may have a first bent part and second and third bent parts located at both sides of the first bent part. Accordingly, the data lines 152 are also inclined with respect to the gate lines 122 with the predetermined angle and have bent parts in correspondence to the individual pixel regions in parallel to the pixel electrode 182.

An alignment layer (not shown) is formed on the pixel electrode 182, and the alignment layer may be rubbed along the second direction.

In the current embodiment, the common line 174 includes the third part 174c, which extends along the second direction by the predetermined length and overlaps the data line 152, and the third part 174c of the common line 174 is also inclined with respect to the gate lines 122 with the predetermined angle as the data lines 152. The alignment layer has a step height at its top surface due to the common line 174, and the step height may cause rubbing problems when the alignment layer is rubbed. More particularly, the alignment layer is rubbed in a predetermined direction to thereby determine an initial arrangement of liquid crystal molecules of the liquid crystal display device. A surface of the alignment layer is rubbed by a roller, which a rubbing cloth is wound around, by rotating the roller in the predetermined direction and making the roller passing on the surface of the alignment layer. By the way, if the alignment layer has the step height, a portion of the alignment layer around the step height does not contact the rubbing cloth and is not properly rubbed. Thus, the rubbing problems are caused, and the liquid crystal molecules around the step height are differently arranged from those in other areas, thereby resulting in light leakage. Specially, in the present invention, since the third part 174c of the common line 174, which makes the step height, is not parallel to and is inclined with a rubbing direction, the rubbing problems may be caused due to the third part 174c, and there may be light leakage to thereby increase the brightness of a black image. Accordingly, to prevent the rubbing problems, it is beneficial that the third part 174c has the predetermined length, which is less than half of a length of the pixel region along the second direction. For example, the third part 174c may have a length of about 25 micrometers.

Meanwhile, in the current embodiment, the common electrode 172 is formed over the entire surface of the substrate and the pixel electrode 182 over the common electrode 172 overlaps the common electrode 172. However, in another embodiment, the common electrode and the pixel electrode each may have a plurality of patterns in each pixel region, and the patterns of the common electrode and the pixel electrode may alternate with each other. Or, in another embodiment, the pixel electrode may be formed to have an area corresponding to the pixel region, and the common electrode may be formed over the pixel electrode all over the substrate and have openings in the pixel region.

Figure 5:
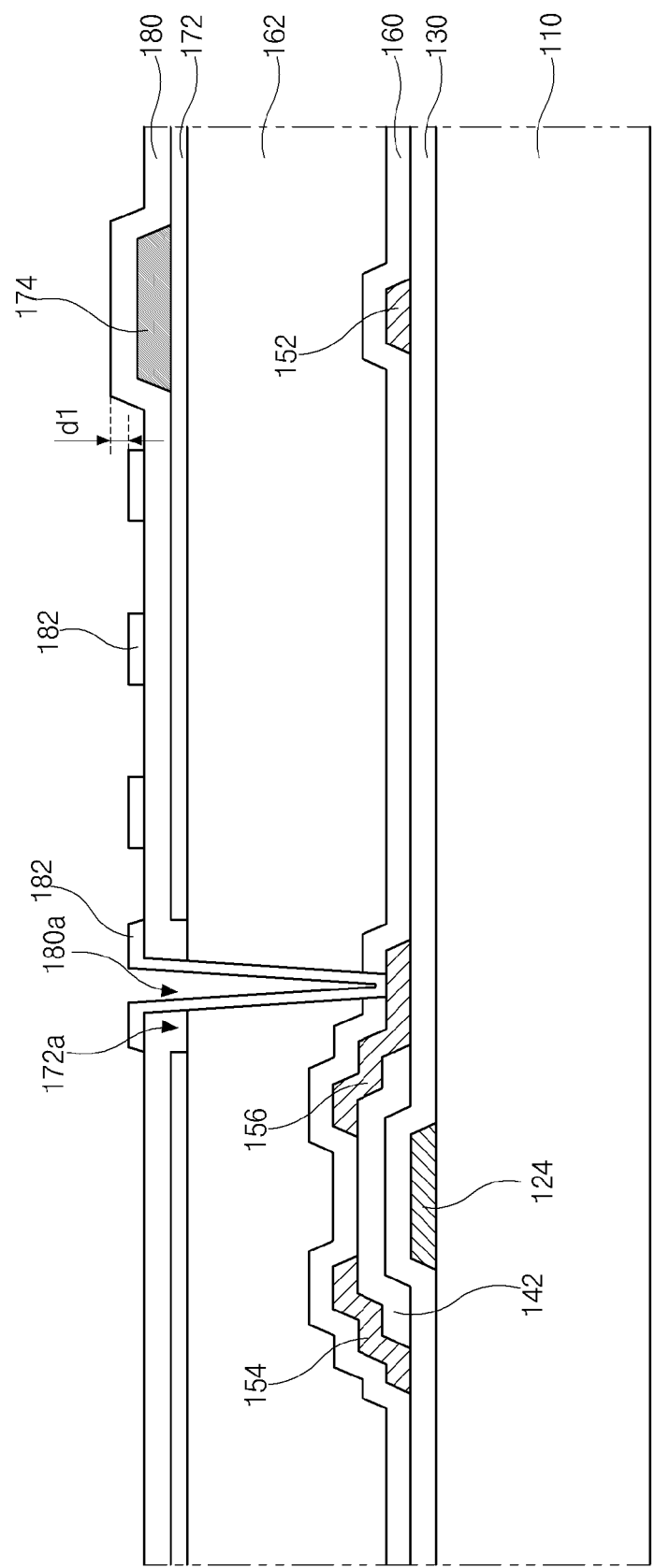
FIG. 5 is a cross-sectional view of schematically illustrating an array substrate for a liquid crystal display device according to an embodiment of the present invention.

FIG. 5 is a cross-sectional view of schematically illustrating an array substrate for a liquid crystal display device according to an embodiment of the present invention.

In FIG. 5, a gate electrode 124 is formed on an insulating substrate 110. Although not shown in the figure, a gate line 122 of FIG. 4 is formed on the substrate 110, and the gate line 122 contacts the gate electrode 124 and extends from a first direction. The gate line 122 and the gate electrode 124 are formed of a metallic material having relatively low resistivity.

A gate insulating layer 130 is formed on the gate line 122 and the gate electrode 124. The gate insulating layer 130 is formed of an inorganic insulating material such as silicon nitride or silicon oxide.

An active layer 142 is formed on the gate insulating layer 130 over the gate electrode 124. The active layer 142 is formed of intrinsic amorphous silicon.

Source and drain electrodes 154 and 156 are formed on the active layer 142. The source and drain electrodes 154 and 156 are spaced apart from each other over the gate electrode 124. A data line 152 is formed on the gate insulating layer 130. The data line 152 is connected to the source electrode 154 and extends along a second direction. The data line 152 crosses the gate line 122 of FIG. 4 to define a pixel region. The data line 152, the source electrode 154 and the drain electrode 156 are formed of a metallic material having relatively low resistivity.

Meanwhile, ohmic contact layers (not shown) of impurity-doped amorphous silicon are formed between the active layer 142 and the source electrode 154 and between the active layer 142 and the drain electrode 156.

Here, the gate electrode 124, the active layer 142, the source electrode 154 and the drain electrode 156 constitute a thin film transistor, and a structure of the thin film transistor is not limited to that shown in FIG. 5.

A first passivation layer 160 is formed on the data line 152, the source electrode 154 and the drain electrode 156, and a second passivation layer 162 for planarization is formed on the first passivation layer 160. The first passivation layer 160 is formed of an inorganic insulating material such as silicon nitride or silicon oxide. The second passivation layer 162 is formed of an organic insulating material such as photo acryl and has a flat top surface. Here, the first passivation layer 160 may be omitted.

A common electrode 172 is formed on the second passivation layer 162 all over the substrate 110. The common electrode 172 is formed of a transparent conductive material such as indium tin oxide or indium zinc oxide and has an opening 172a in correspondence to the drain electrode 156.

A common line 174 is formed on the common electrode 172. The common line 174 may have a single-layered structure or a double-layered structure selected from copper (Cu), copper alloy, or molybdenum and titanium (MoTi). Here, the common line 174 corresponds to the third part 174c of FIG. 4, which is located over the data line 152.

A third passivation layer 180 is formed on the common line 174. The third passivation layer 180 has a drain contact hole 180a exposing the drain electrode 156 with the first and second passivation layers 160 and 162. Namely, the drain contact hole 180a is also formed in the first and second passivation layers 160 and 162. The drain contact hole 180a passes through the opening 172a. The third passivation layer 180 is formed of an inorganic insulating material such as silicon nitride or silicon oxide and has a step height at its top surface due to the common line 174.

A pixel electrode 182 is formed in the pixel region on the third passivation layer 180. The pixel electrode 182 is formed of a transparent conductive material such as indium tin oxide or indium zinc oxide. The pixel electrode 182 includes a plurality of electrode patterns spaced apart from each other and overlapping the common electrode 172.

In the present invention, column spacers are supported by the step height due to the common line 174 on the common electrode 172, and an alignment layer (not shown) on the pixel electrode 182 in the pixel region is prevented from being damaged when the column spacers are shifted. It is desirable that a difference dl between a height from a top surface of the third passivation layer 180 on the common line 174 to the top surface of the third passivation layer 180 on the pixel region and a height from a top surface of the pixel electrode 182 in the pixel region to the top surface of the third passivation layer 180 on the pixel region is more than about 500 Å, that is, the height of the top surface of the third passivation layer 180 on the common line 174 is about 500 Å larger than the height of the top surface of the pixel electrode 182 in the pixel region, and to do this, the common line 174 may have a thickness of about 1000 Å to 1500 Å. In other words, the alignment layer on the third passivation layer 180 on the common line is higher than the alignment layer on the pixel electrode 182 in the pixel region.

Figure 6A:
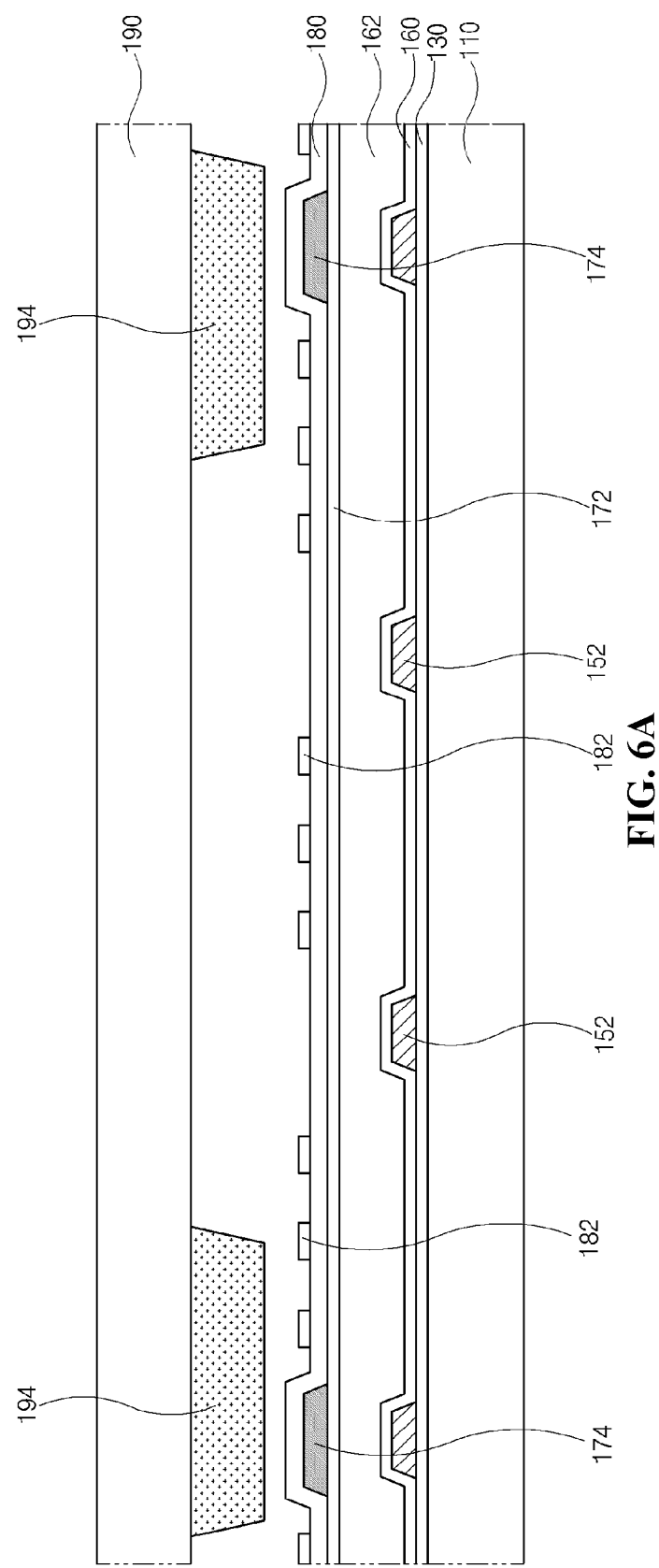
FIGS. 6A and 6B are cross-sectional views of schematically illustrating a liquid crystal display device according to an embodiment of the present invention before and after an external force is applied, respectively.
Figure 6B:
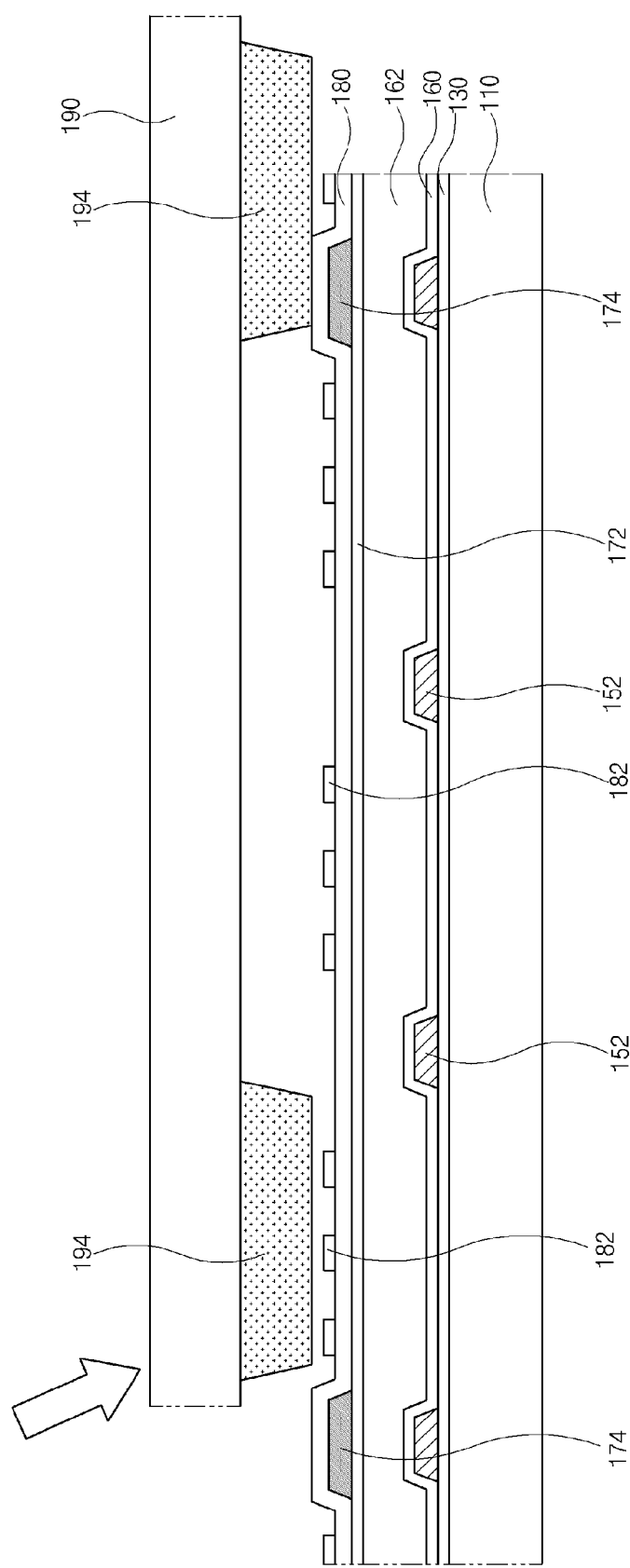

FIGS. 6A and 6B are cross-sectional views of schematically illustrating a liquid crystal display device according to an embodiment of the present invention before and after an external force is applied, respectively. FIGS. 6A and 6B show pixel regions corresponding to a cross-section taken along the first direction in FIG. 4.

In FIGS. 6A and 6B, first and second substrates 110 and 190 are spaced apart from and face each other.

A gate insulating layer 130 is formed on an inner surface of the first substrate 110, and data lines 152 are formed on the gate insulating layer 130. The data lines 152 are spaced apart from each other with a predetermined distance, and an area between adjacent data lines 152 is a pixel region.

A first passivation layer 160 and a second passivation layer 162 are sequentially formed on the data lines 152, and the second passivation layer 162 has a flat top surface.

A common electrode 172 is formed on the second passivation layer 162 corresponding to an entire surface of the first substrate 110. Common lines 174 are formed on the common electrode 172, and the common lines 174 are disposed over some of the data lines 152. Here, each of the common lines 174 corresponds to the third part 174c of FIG. 4.

A third passivation layer 180 is formed on the common lines 174. The third passivation layer 180 has a step height at its top surface due to the common lines 174.

A pixel electrode 182 is formed on the third passivation layer 180 at each pixel region between the data lines 152. The pixel electrode 182 includes a plurality of electrode patterns spaced apart from each other.

Although not shown in the figures, a first alignment layer is formed on the pixel electrodes 182. The first alignment layer is formed over a substantially entire surface of the first substrate 110. Accordingly, the first alignment layer may be formed on the third passivation layer 180 corresponding to the common lines 174.

In the meantime, first column spacers (not shown) and second column spacers 194 are formed on an inner surface of the second substrate 190. The first column spacers and the second column spacers 194 are located in correspondence to the common lines 174. A height of the first column spacers is larger than a height of the second column spacers 194, and a width and a length of the first column spacers are smaller than a width and a length of the second column spacers 194.

Although not shown in the figures, a black matrix, a color filter layer, and an overcoat layer are formed between the second substrate 190 and the first and second column spacers 194. The black matrix has openings corresponding to the pixel regions, and the color filter layer is disposed in correspondence to the openings of the black matrix. The color filter layer includes red, green and blue color filter patterns, and each color filter pattern corresponds to one pixel region. The overcoat layer covers the color filter layer.

The first column spacers and the second column spacers 194 are formed on the black matrix.

Meanwhile, a second alignment layer (not shown) is formed between the overcoat layer and the first and second column spacers 194 or on the first and second column spacers 194. In addition, a liquid crystal layer (not shown) is disposed between the first alignment layer and the second alignment layer.

As shown in FIG. 6A, the second column spacers 194 are spaced apart from and disposed over the third passivation layer 180 on the common lines 174 before an external force is applied. As stated above, the common lines 174 of FIG. 6A correspond to the third parts 174c of FIG. 4, and the second column spacers 194 are actually located in correspondence to the second parts 174b of FIG. 4. However, for convenience of explanation, the second column spacers 194 are shown in correspondence to the third parts 174c of FIG. 4. Here, one of adjacent second column spacers 194 is disposed such that its center is shifted to the right relatively with respect to a corresponding common line 174. The other of the adjacent second column spacers 194 is disposed such that its center is shifted to the left relatively with respect to a corresponding common line 174.

At this time, the first column spacers (not shown) may contact the third passivation layer 180 on the common lines 174, that is, the first part 174a of FIG. 4, and the first column spacers actually contact the first alignment layer over the first part 174a of FIG. 4.

As shown in FIG. 6B, when an external force represented by an arrow is applied to the liquid crystal display device of the present invention, the second substrate 190 moves to the right relatively with respect to the first substrate 110 and is lowered. The second column spacers 194 on the second substrate 190 move together with the second substrate 190, and the second column spacers 194 are disposed out of original locations corresponding to the third parts 174c in FIG. 6B, actually, the second parts 174b of FIG. 4. At this time, at least one of the second column spacers 194 contacts and is supported by the third passivation layer 180 on the common line 174, i.e., the third part 174c of FIG. 4. Actually, one of adjacent second column spacers 194 contacts and is supported by the first alignment layer (not shown) on the common line 174, that is, the third part 174c of FIG. 4, and thus the other of the adjacent second column spacers 194 is prevented from contacting the first alignment layer in the pixel regions.

Meanwhile, when the external force is applied, the first column spacers (not shown) may be disposed out of original locations corresponding to the first parts 174a of FIG. 4 and contact the first alignment layer in the pixel regions. The alignment of the first alignment layer changes due to the contact of the first column spacers and the first alignment layer. However, by widening a width of the black matrix by a movement of the first column spacers, light leakage is prevented. The first column spacers have a lower arrangement density than the second column spacers 194. Thus, in the present invention, since the width of the black matrix is minimally increased, a decrease of the aperture ratio is prevented, and the light leakage is prevented.

Then, when the applied external force is removed, the liquid crystal display device of the present invention goes back as shown in FIG. 6A.

Accordingly, in the embodiment of the present invention, even though the external force is applied, the second column spacers 194 are supported by the common lines 174 causing the step height. The first alignment layer in the pixel regions does not contact the second column spacers 194, and the light leakage is prevented when a black image is displayed.

The common lines according to the embodiment of the present invention may have various structures, and this will be described in detail with reference to drawings.

Figure 7A:
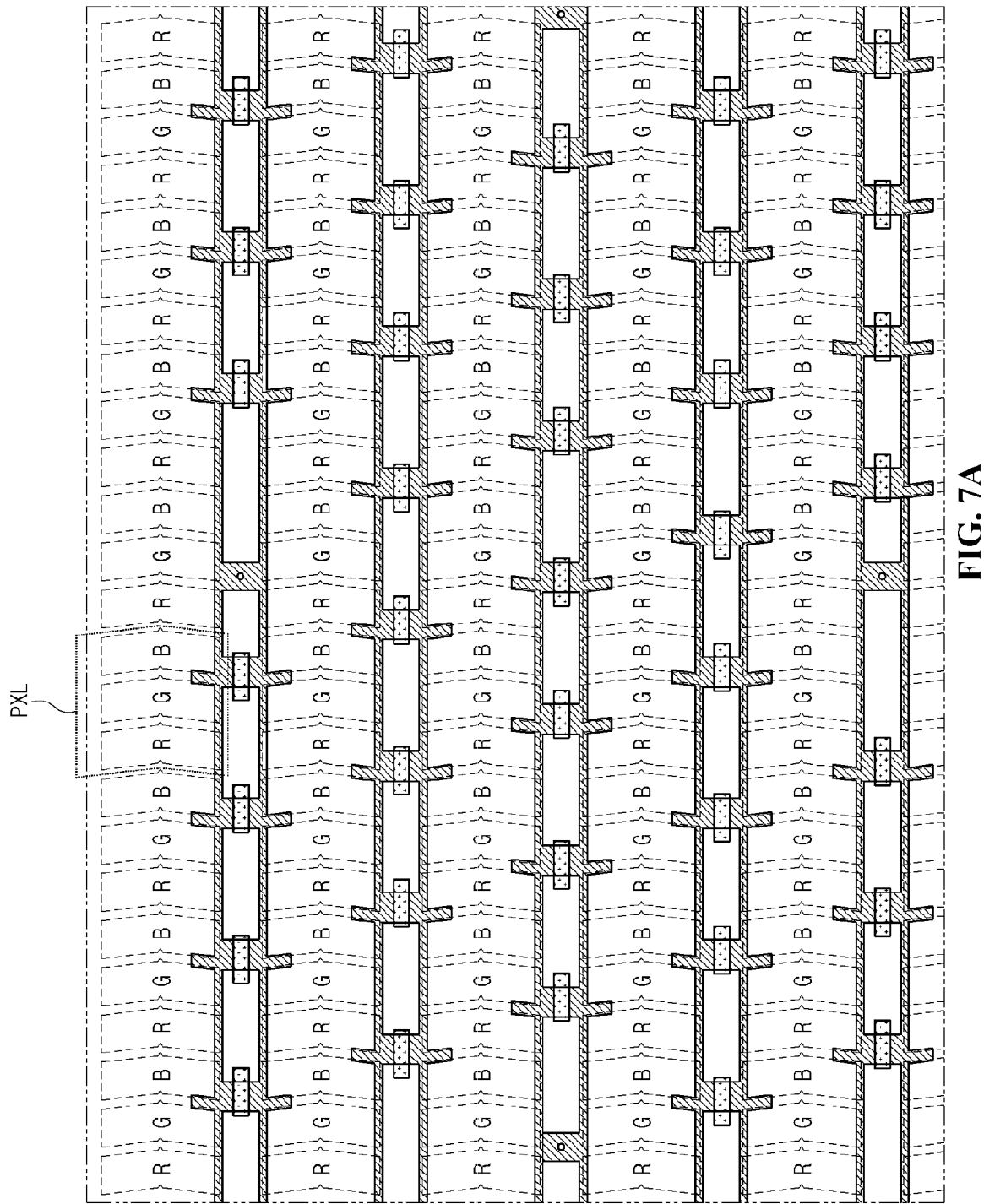
FIGS. 7A to 7D are views of schematically illustrating examples of common lines of a liquid crystal display device according to an embodiment of the present invention.

FIGS. 7A to 7D are views of schematically illustrating examples of common lines of a liquid crystal display device according to an embodiment of the present invention, and FIGS. 7A to 7D schematically show common lines, pixels, first column spacers and second column spacers. Here, FIG. 7A shows common lines having the same structure as the common lines shown in FIG. 4. In the meantime, the common lines are represented by hatched portions, the first column spacers by circles, and the second column spacers by rectangles.

In FIGS. 7A to 7D, red, green and blue sub pixels R, G and B, each of which corresponds to one pixel region, form a pixel PXL. A first column spacer or a second column spacer is disposed in correspondence to each pixel PXL. Here, the arrangement density of the first column spacers is lower than the arrangement density of the second column spacers. For example, the first column spacer may be arranged every 8 pixels in a first direction and may be arranged every 4 pixels in a second direction.

As shown in FIG. 7A, each common line may include first and second parts corresponding to the first and second column spacers, respectively. The common line may also include a third part and a fourth part. The third part extends from each of both sides of the second part, that is, first and second ends of the second part along the second direction by a predetermined length. The fourth part consists of first and second line patterns, which extend along the first direction. The first line pattern connects first ends of the first and second parts, and the second line pattern connects second ends of the first and second parts.

Figure 7B:
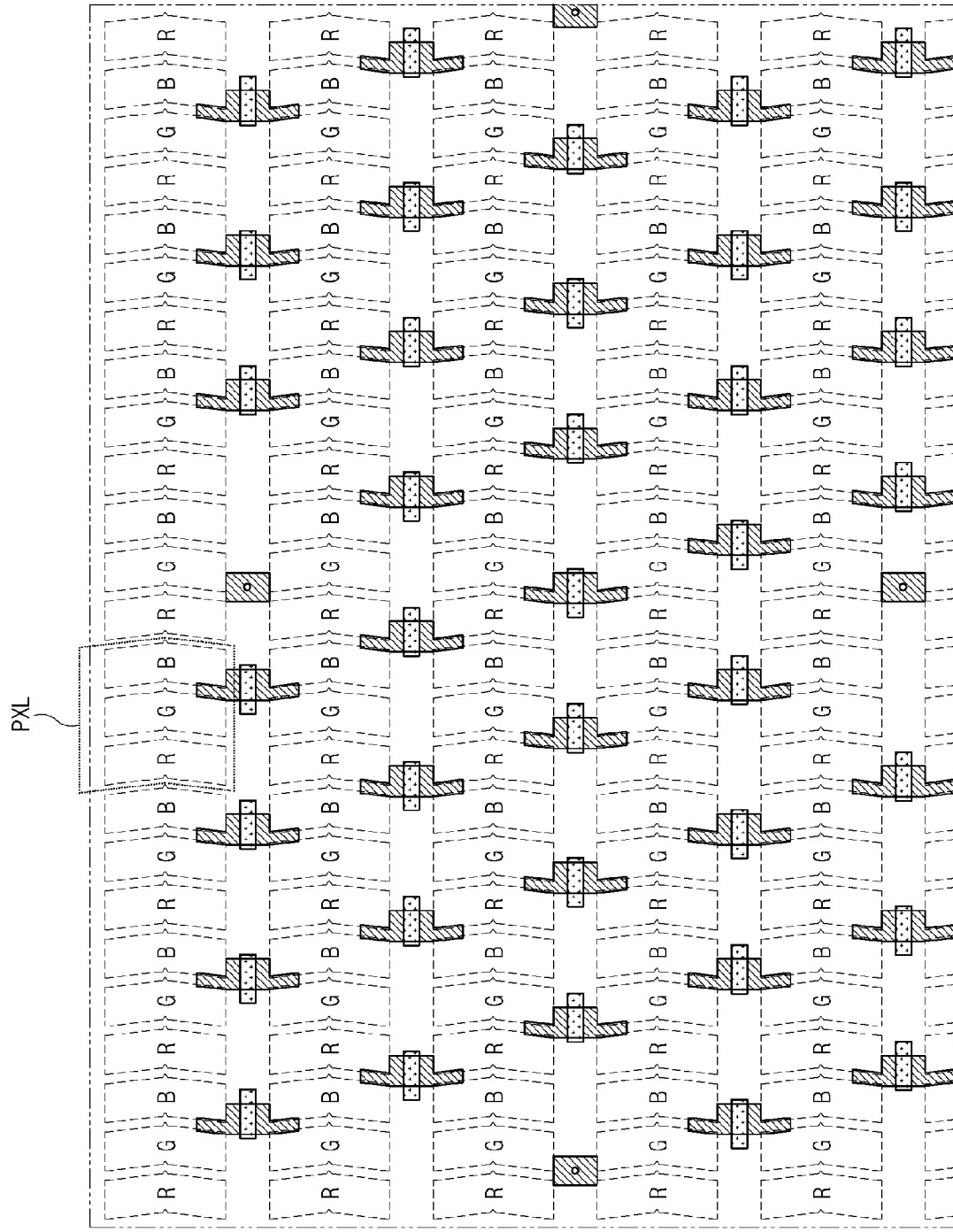

As shown in FIG. 7B, each common line may include first, second and third parts. At this time, the first and second parts correspond to the first and second column spacers, respectively. The third part extends from each of first and second ends of the second part along the second direction by a predetermined length.

Figure 7C:
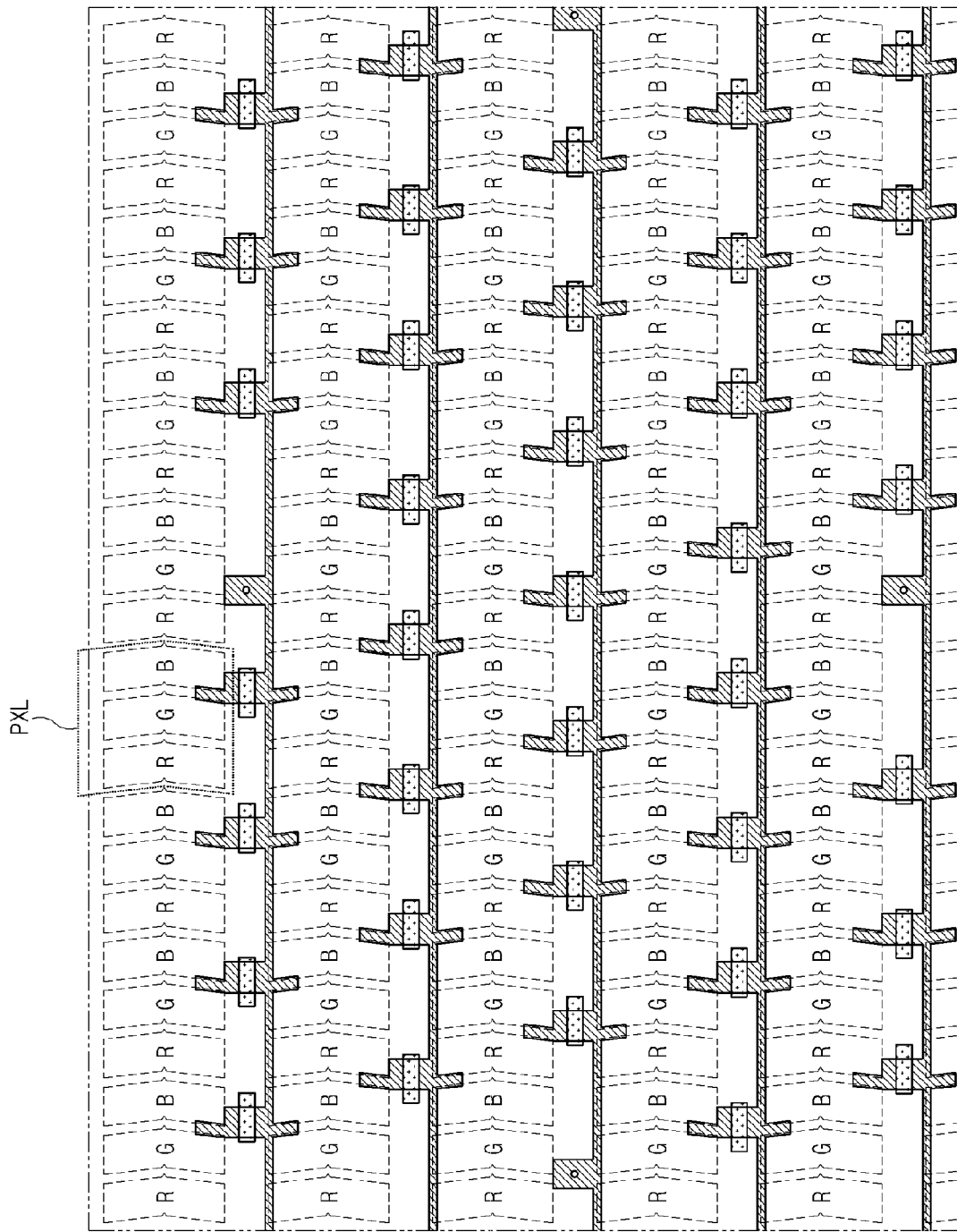

As shown in FIG. 7C, each common line may include first, second, third and fourth parts. At this time, the first and second parts correspond to the first and second column spacers, respectively. The third part extends from each of first and second ends of the second part along the second direction by a predetermined length. The fourth part extends along the first direction and connects first ends of the first and second parts or second ends of the first and second parts. For example, in FIG. 7C, the fourth part connects the second ends of the first and second parts.

Figure 7D:
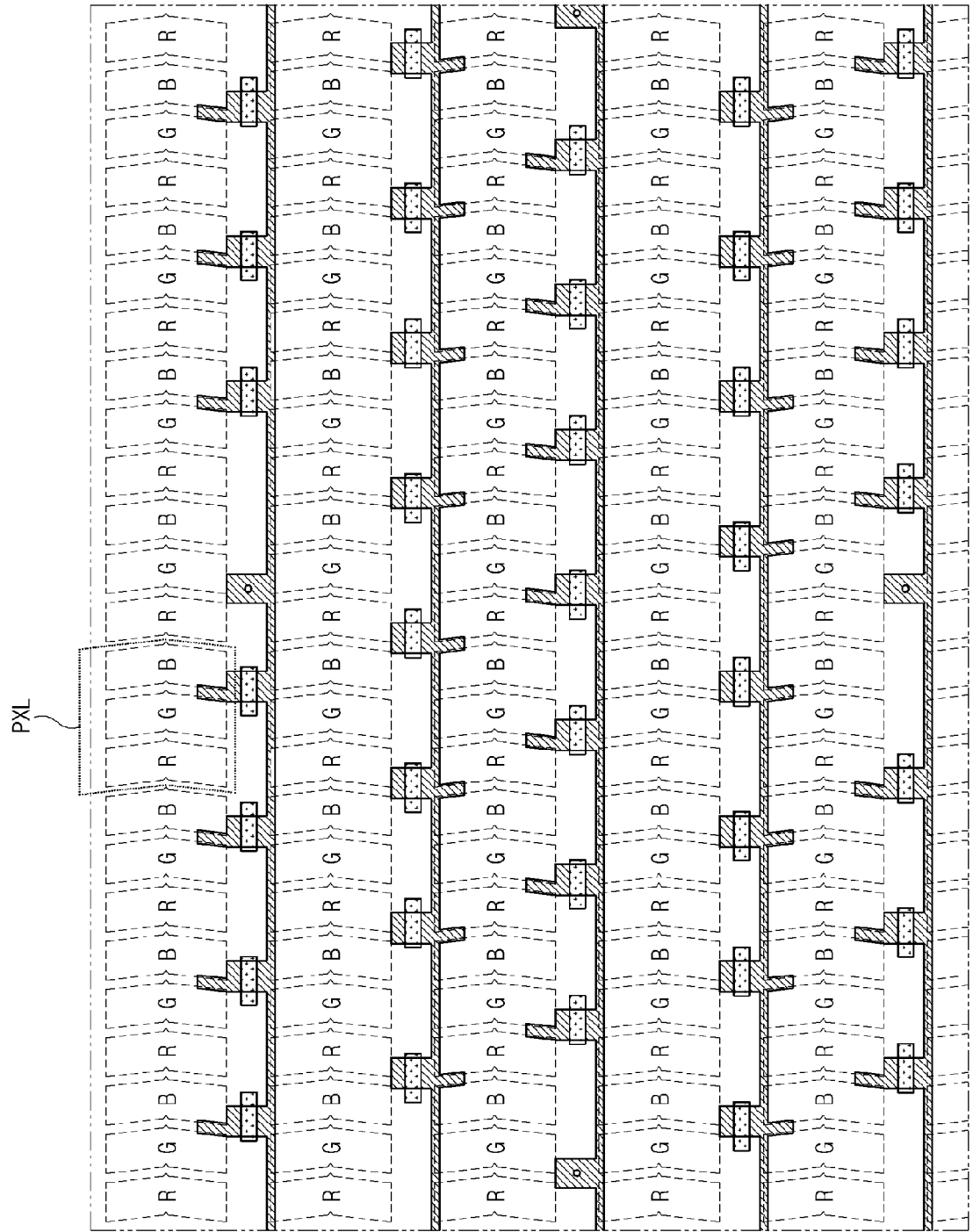

As shown in FIG. 7D, each common line may includes first, second, third and fourth parts. At this time, the first and second parts correspond to the first and second column spacers, respectively. The third part extends from a first or second end of the second part along the second direction by a predetermined length. The fourth part extends along the first direction and connects first ends of the first and second parts or second ends of the first and second parts. For example, in FIG. 7D, the fourth part connects the second ends of the first and second parts. Here, the third parts of odd common lines extend from the first ends of the second parts along the second direction, and the third parts of even common lines extend from the second ends of the second parts along the second direction.

Meanwhile, the second column spacers are disposed such that their centers are shifted to the right or to the left with respect to the centers of the second parts. For instance, one of adjacent two second column spacers may be disposed such that its center is shifted to the right with respect to the corresponding second part, and the other of the adjacent two second column spacers may be disposed such that its center is shifted to the left with respect to the corresponding second part.

Figure 8A:
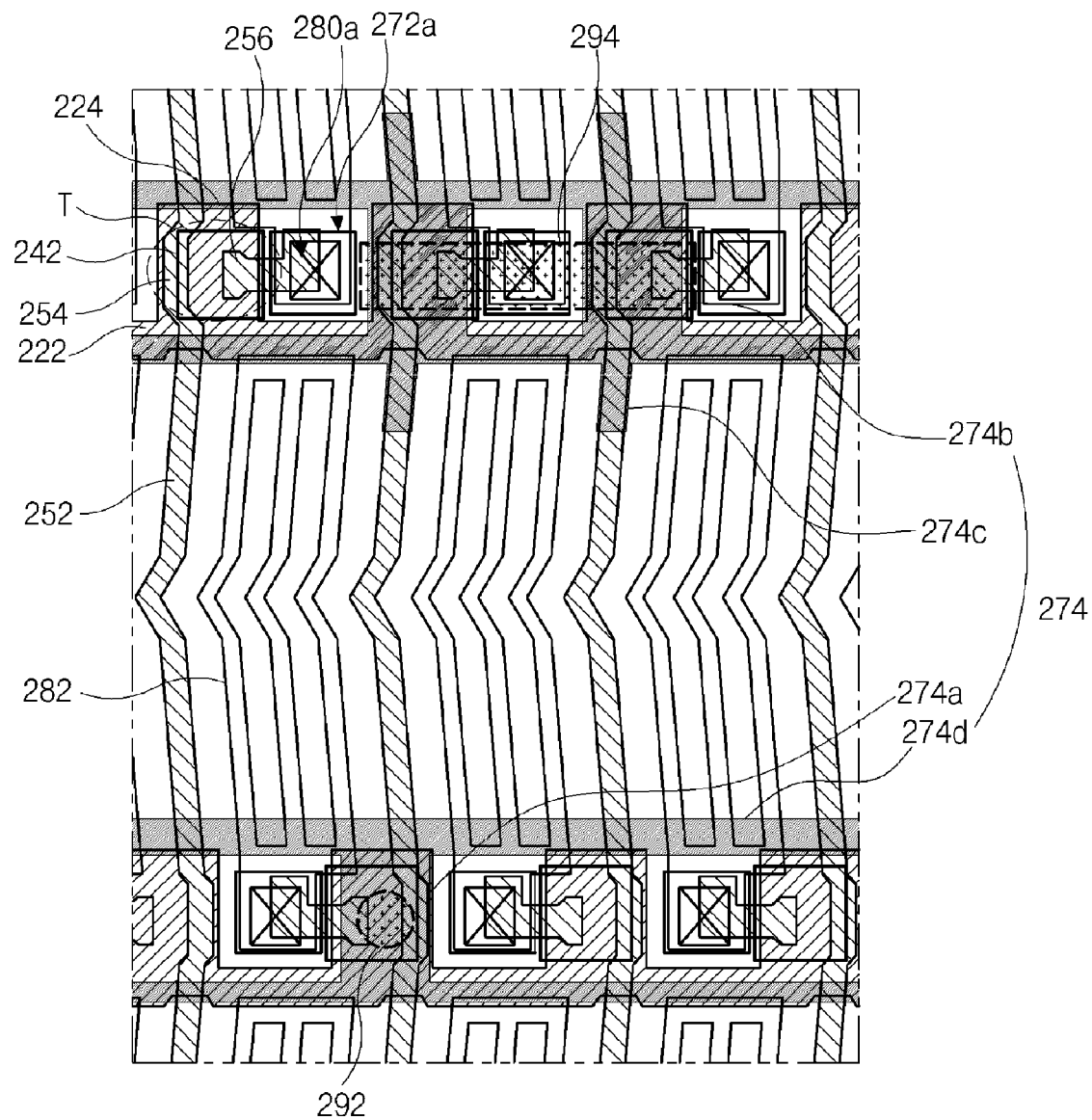
FIG. 8A is a plan view of an array substrate of a liquid crystal display device according to another embodiment of the present invention.
Figure 8B:
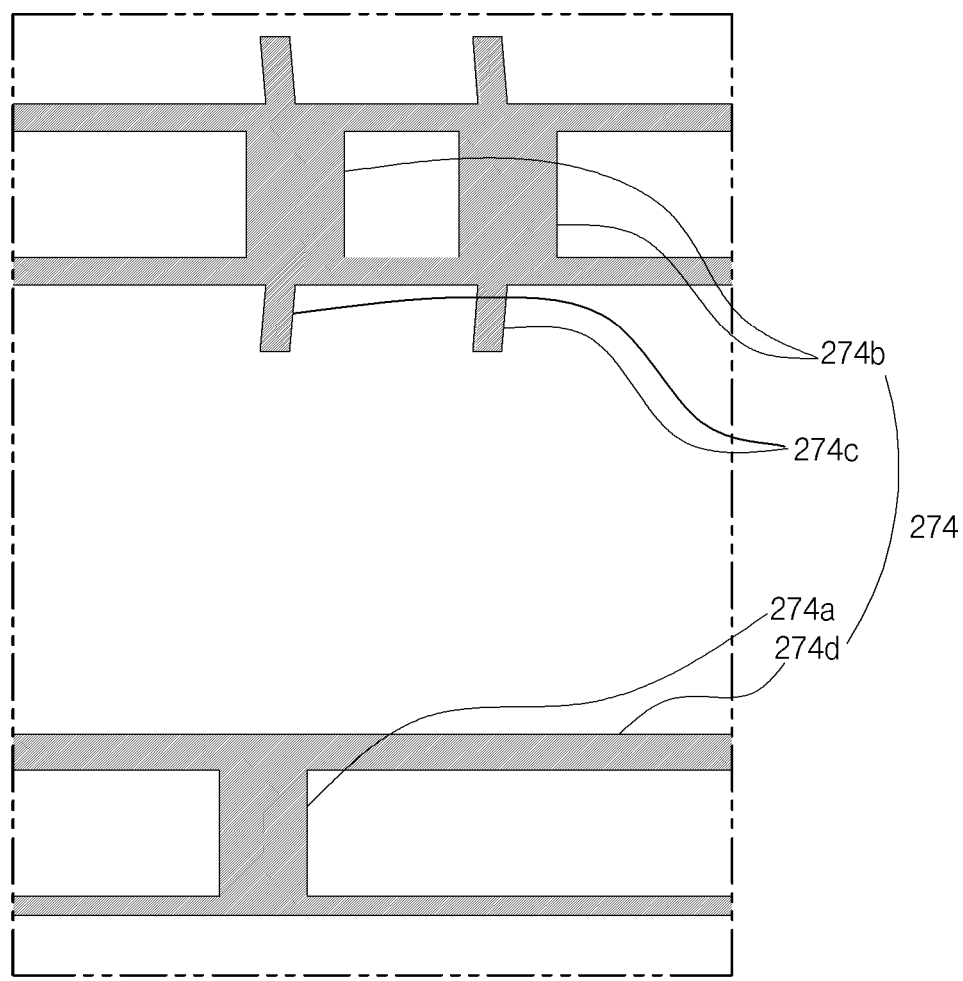
FIG. 8B is a cross-sectional view of schematically illustrating only common lines of FIG. 8A.

FIG. 8A is a plan view of an array substrate of a liquid crystal display device according to another embodiment of the present invention, and FIG. 8B is a cross-sectional view of schematically illustrating only common lines of FIG. 8A. For convenience of explanation, first and second column spacers which are formed on a color filter substrate are illustrated together in FIG. 8A.

In FIG. 8A, gate lines 222 and gate electrodes 224 are formed on an insulating substrate (not shown). The gate lines 222 extend in a first direction, and the gate electrodes 224 are connected to the gate lines 222.

A gate insulating layer (not shown) is formed on the gate lines 222 and the gate electrodes 224.

Active layers 242 of amorphous silicon are formed on the gate insulating layer over the gate electrodes 224.

Data lines 252, source electrodes 254 and drain electrode 256 are formed on the gate insulating layer and the active layers 242. The data lines 252 extend in a second direction, the source electrodes 254 are connected to the data lines 252, and the drain electrodes 256 are spaced apart from the source electrodes 254. The data lines 252 cross the gate lines 222 to define pixel regions. The source and drain electrodes 254 and 256 are spaced apart from each other over the corresponding active layers 242.

In the current embodiment, parts of the data lines 252 are the source electrodes 254, but parts extending from the data lines 252 may become the source electrodes 254.

A gate electrode 224, an active layer 242, a source electrode 254, and a drain electrode 256 constitute a thin film transistor T, and the active layer 242 between the source electrode 254 and the drain electrode 256 becomes a channel of the thin film transistor T.

Here, the thin film transistor T is not limited to the structure shown in FIG. 8A, and the structure of the thin film transistor T can be varied.

In the meantime, as shown in FIG. 8A, the thin film transistors T connected to odd gate lines 222 are connected to the data line 252 of the left side, and the thin film transistors T connected to even gate lines 222 are connected to the data line 252 of the right side. Alternatively, the thin film transistors T connected to odd gate lines 222 may be connected to the data line 252 of the right side, and the thin film transistors T connected to even gate lines 222 may be connected to the data line 252 of the left side.

A first passivation layer (not shown) and a second passivation layer (not shown) are sequentially formed on the data lines 252, the source electrodes 254, and the drain electrodes 256. Here, the first passivation layer is formed of an inorganic insulating material, and the second passivation layer is formed of an organic insulating material and has a flat surface. The first passivation layer may be omitted.

A common electrode (not shown) is formed on the second passivation layer. The common electrode is formed over the entire surface of the substrate and has openings 272a in correspondence to the drain electrodes 256 of the thin film transistors T.

Common lines 274 are formed on the common electrode and contact the common electrode. Referring to FIG. 8A and FIG. 8B, each common line 274 includes first, second, third and fourth parts 274a, 274b, 274c and 274d. The first part 274a is disposed over one of the thin film transistors T and corresponds to a first column spacer 292. The second part 274b includes two patterns, which are disposed over adjacent other thin film transistors T, respectively, and each of which corresponds to a second column spacer 294. The third part 274c extends from each of both sides of the second part 274b, i.e., each of first and second ends of each pattern of the second parts 274b along the second direction by a predetermined length and overlaps the data line 252. The length of the third part 274c may be about 25 micrometers. The fourth part 274d extends along the first direction. The fourth part 274d may include a first line pattern, which connects first ends of the first part 274a and the second part 274b, and a second line pattern, which is parallel to the first line pattern and connects second ends of the first part 274a and the second part 274b. The common lines 274 are formed of a metallic material having relatively low resistivity.

Here, the first column spacer 292 is a gap-forming spacer and has a circular shape in a flat structure. The second column spacer 294 is a press-preventing spacer and has a bar or rectangular shape in a flat structure. The first column spacer 292 may have a rectangular shape in the flat structure. It is beneficial that a width and a length of the second column spacer 294 are larger than a diameter of the first column spacer 292.

The diameter of the first column spacer 292 is smaller than lengths of the first part 274a along the first and second directions, and edges of the first column spacer 292 are disposed within edges of the first part 274a. On the other hand, the length of the second column spacer 294 along the first direction is larger than a length of the pixel region along the first direction, the second column spacer 294 overlaps the patterns of the second part 274b, and both sides of the second column spacer 294 are disposed outside the edges of the patterns of the second part 274b, respectively.

A third passivation layer (not shown) is formed on the common lines 274. The third passivation layer is formed of an inorganic insulating material, such as silicon oxide or silicon nitride, and has a step height at its top surface due to the lower layer, that is, the common lines 274. Also, the third passivation layer has drain contact holes 280a to expose the drain electrodes 256 through the first passivation layer and the second passivation layer. The drain contact holes 280a are disposed in the openings 272a, respectively.

A pixel electrode 282 is formed in each pixel region on the third passivation layer. The pixel electrode 282 includes a plurality of electrode patterns extending along the second direction and spaced apart from each other along the first direction. The pixel electrode 282 contacts the drain electrode 256 through the drain contact hole 280a in each pixel region.

The pixel electrode 282 is inclined with respect to the gate lines 222 with a predetermined angle and has at least one bent part at its center portion. As shown in FIG. 8A, the pixel electrode 282 may have a first bent part and second and third bent parts located at both sides of the first bent part. Accordingly, the data lines 252 are also inclined with respect to the gate lines 222 with the predetermined angle and have bent parts in correspondence to the individual pixel regions in parallel to the pixel electrode 282.

An alignment layer (not shown) is formed on the pixel electrode 282, and the alignment layer may be rubbed along the second direction.

Figure 9A:
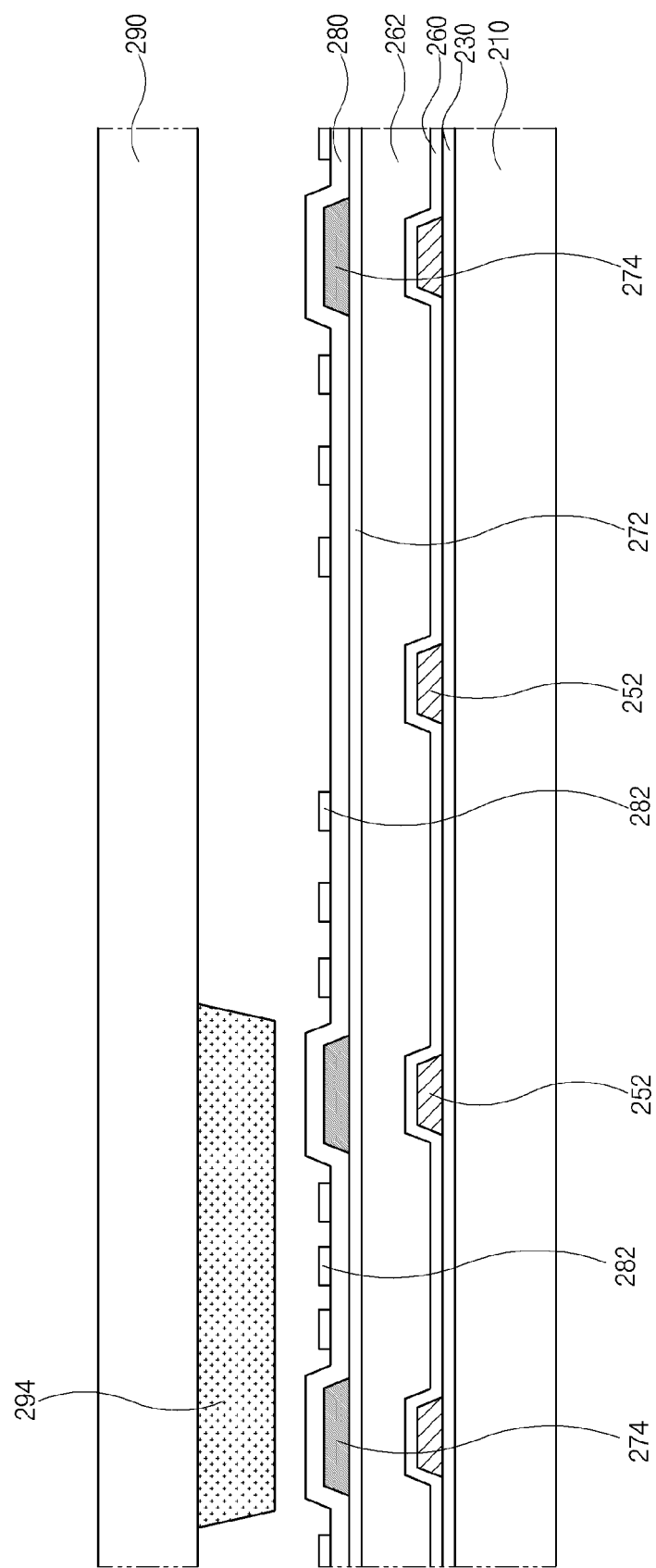
FIGS. 9A and 9B are cross-sectional views of schematically illustrating a liquid crystal display device according to another embodiment of the present invention before and after an external force is applied, respectively.
Figure 9B:
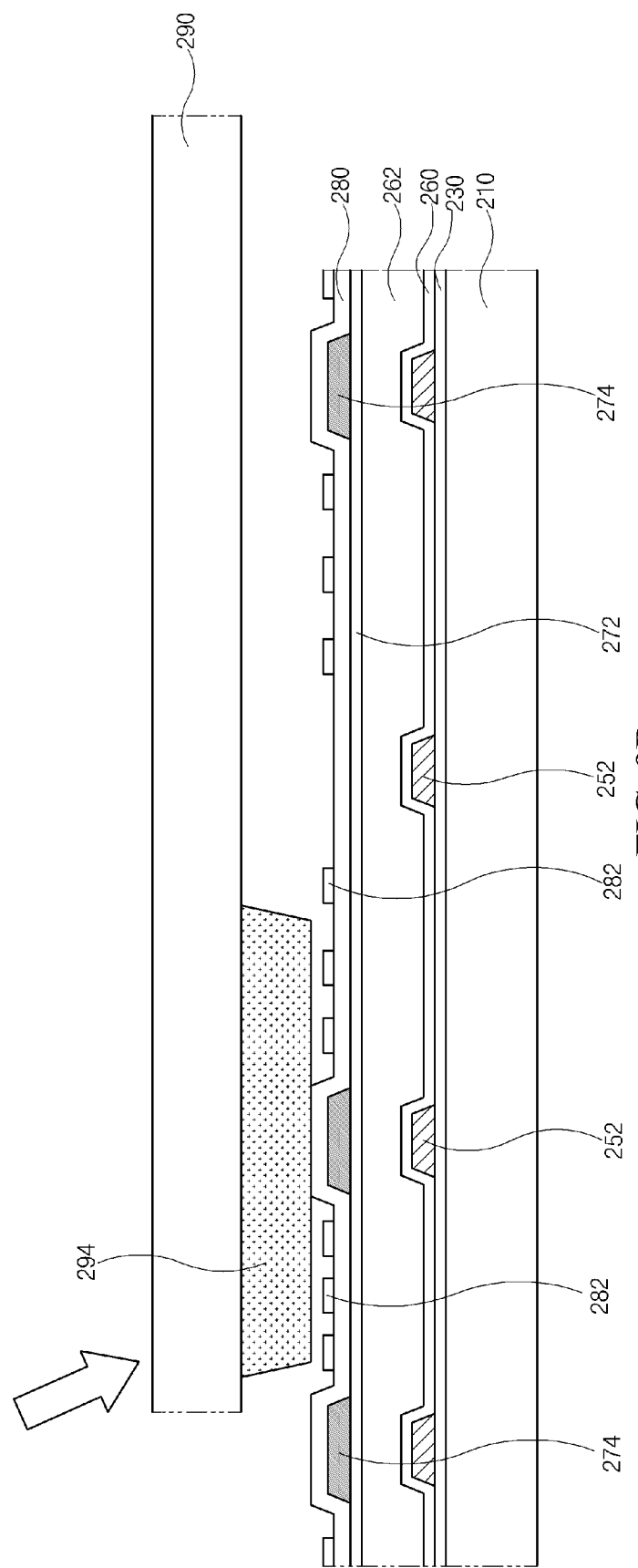

FIGS. 9A and 9B are cross-sectional views of schematically illustrating a liquid crystal display device according to another embodiment of the present invention before and after an external force is applied, respectively. FIGS. 9A and 9B show pixel regions disposed along the first direction in FIG. 8A.

In FIGS. 9A and 9B, first and second substrates 210 and 290 are spaced apart from and face each other.

A gate insulating layer 230 is formed on an inner surface of the first substrate 210, and data lines 252 are formed on the gate insulating layer 230. The data lines 252 are spaced apart from each other with a predetermined distance, and an area between adjacent data lines 252 is a pixel region.

A first passivation layer 260 and a second passivation layer 262 are sequentially formed on the data lines 252, and the second passivation layer 262 has a flat top surface.

A common electrode 272 is formed on the second passivation layer 262 corresponding to an entire surface of the first substrate 210. Common lines 274 are formed on the common electrode 272, and the common lines 274 are disposed over some of the data lines 252. Here, each of the common lines 274 corresponds to the third part 274c of FIG. 8A.

A third passivation layer 280 is formed on the common lines 274. The third passivation layer 280 has a step height at its top surface due to the common lines 274.

A pixel electrode 282 is formed on the third passivation layer 280 at each pixel region between the data lines 252. The pixel electrode 282 includes a plurality of electrode patterns spaced apart from each other.

Although not shown in the figures, a first alignment layer is formed on the pixel electrodes 282. The first alignment layer is formed over a substantially entire surface of the first substrate 210. Accordingly, the first alignment layer may be formed on the third passivation layer 280 corresponding to the common lines 274.

In the meantime, first column spacers (not shown) and second column spacers 294 are formed on an inner surface of the second substrate 290. The first column spacers and the second column spacers 294 are located in correspondence to the common lines 274. A height of the first column spacers is larger than a height of the second column spacers 294, and a width and a length of the first column spacers are smaller than a width and a length of the second column spacers 294.

Although not shown in the figures, a black matrix, a color filter layer, and an overcoat layer are formed between the second substrate 290 and the first and second column spacers 294.

Meanwhile, a second alignment layer (not shown) is formed between the overcoat layer and the first and second column spacers 294 or on the first and second column spacers 294. In addition, a liquid crystal layer (not shown) is disposed between the first alignment layer and the second alignment layer.

As shown in FIG. 9A, the second column spacers 294 are spaced apart from and disposed over the third passivation layer 280 on the common lines 274 before an external force is applied. As stated above, the common lines 274 of FIG. 9A correspond to the third parts 274c of FIG. 8A, and the second column spacers 294 are actually located in correspondence to the second parts 274b of FIG. 8A. However, for convenience of explanation, the second column spacers 294 are shown in correspondence to the third parts 274c of FIG. 8A. Here, each second column spacer 294 has a length that covers the common lines 274 over adjacent data lines 252 and the pixel region between the adjacent data lines 252.

At this time, the first column spacers (not shown) may contact the third passivation layer 280 on the common lines 274, that is, the first part 274a of FIG. 8A, and the first column spacers actually contact the first alignment layer over the first part 274a of FIG. 8A.

As shown in FIG. 9B, when an external force represented by an arrow is applied to the liquid crystal display device of the present invention, the second substrate 290 moves to the right relatively with respect to the first substrate 210 and is lowered. The second column spacers 294 on the second substrate 290 move together with the second substrate 290, and the second column spacers 294 are disposed out of original locations corresponding to the second parts 274b of FIG. 8A. At this time, each second column spacer 294 contacts and is supported by the third passivation layer 280 on the common line 274, more particularly, one of adjacent third parts 274c of FIG. 8A. Actually, the second column spacer 294 contacts and is supported by the first alignment layer (not shown) on one of adjacent third parts 274c of FIG. 8A, and thus the second column spacer 294 is prevented from contacting the first alignment layer in the pixel region.

Then, when the applied external force is removed, the liquid crystal display device of the present invention goes back as shown in FIG. 9A.

Accordingly, in another embodiment of the present invention, even though the external force is applied, the second column spacers 294 are supported by the common lines 274 causing the step height. The first alignment layer in the pixel regions does not contact the second column spacers 294, and the light leakage is prevented when a black image is displayed.

Meanwhile, the common lines according to another embodiment of the present invention may have various structures and may have the similar structures to those shown in FIGS. 7A to 7D.

Figure 10:
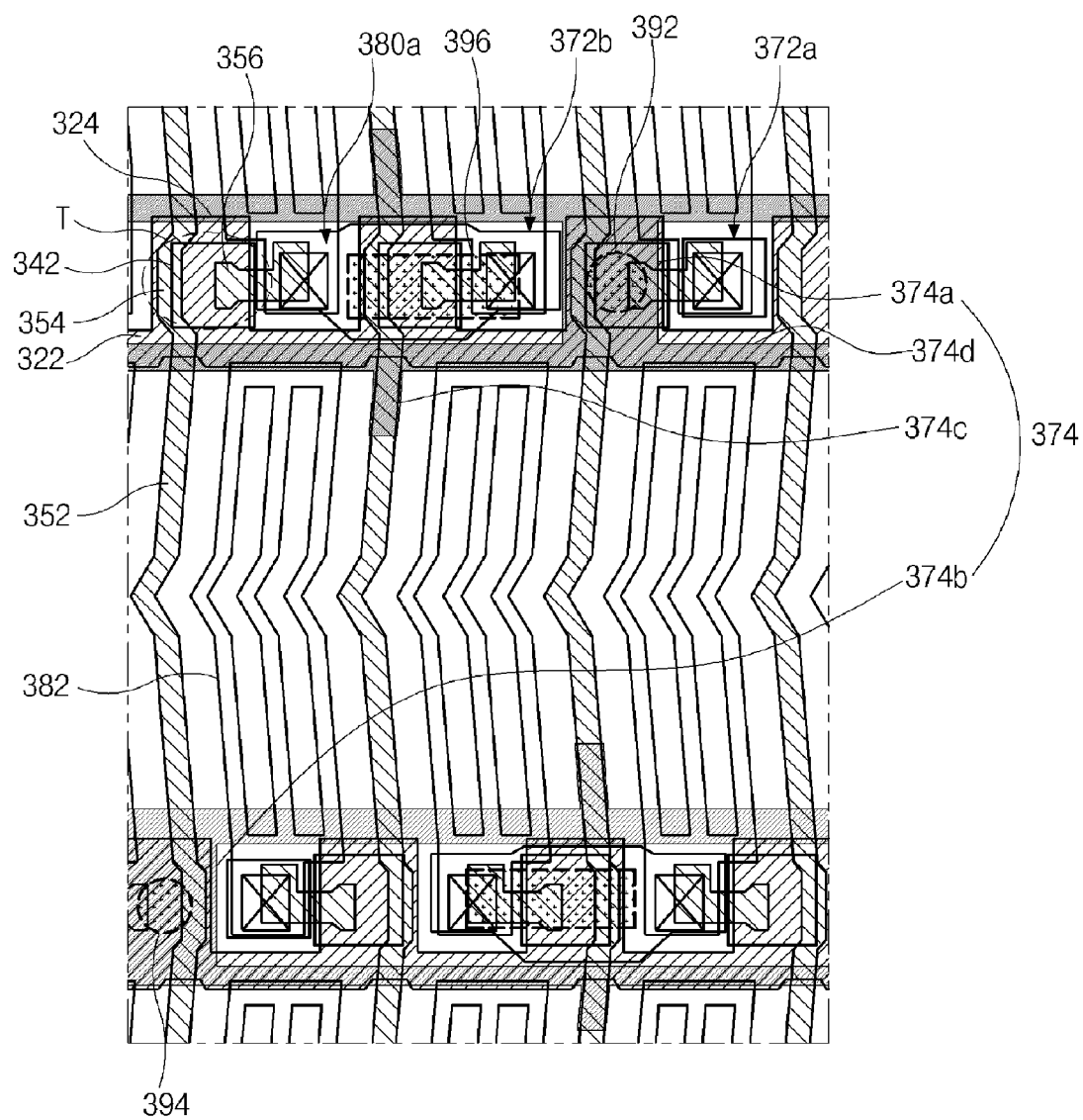
FIG. 10 is a plan view of an array substrate of a liquid crystal display device according to another embodiment of the present invention.

FIG. 10 is a plan view of an array substrate of a liquid crystal display device according to another embodiment of the present invention. For convenience of explanation, first to third column spacers which are formed on a color filter substrate are illustrated together.

In FIG. 10, gate lines 322 and gate electrodes 324 are formed on an insulating substrate (not shown). The gate lines 322 extend in a first direction, and the gate electrodes 324 are connected to the gate lines 322.

A gate insulating layer (not shown) is formed on the gate lines 322 and the gate electrodes 324.

Active layers 342 of amorphous silicon are formed on the gate insulating layer over the gate electrodes 324.

Data lines 352, source electrodes 354 and drain electrode 356 are formed on the gate insulating layer and the active layers 342. The data lines 352 extend in a second direction, the source electrodes 354 are connected to the data lines 352, and the drain electrodes 356 are spaced apart from the source electrodes 354. The data lines 352 cross the gate lines 322 to define pixel regions. The source and drain electrodes 354 and 356 are spaced apart from each other over the corresponding active layers 342.

In the current embodiment, parts of the data lines 352 are the source electrodes 354, but parts extending from the data lines 352 may become the source electrodes 354.

A gate electrode 324, an active layer 342, a source electrode 354, and a drain electrode 356 constitute a thin film transistor T, and the active layer 342 between the source electrode 354 and the drain electrode 356 becomes a channel of the thin film transistor T.

Here, the thin film transistor T is not limited to the structure shown in FIG. 10, and the structure of the thin film transistor T can be varied.

In the meantime, as shown in FIG. 10, the thin film transistors T connected to odd gate lines 322 are connected to the data line 352 of the left side, and the thin film transistors T connected to even gate lines 322 are connected to the data line 352 of the right side. Alternatively, the thin film transistors T connected to odd gate lines 322 may be connected to the data line 352 of the right side, and the thin film transistors T connected to even gate lines 322 may be connected to the data line 352 of the left side.

A first passivation layer (not shown) and a second passivation layer (not shown) are sequentially formed on the data lines 352, the source electrodes 354, and the drain electrodes 356. Here, the first passivation layer is formed of an inorganic insulating material, and the second passivation layer is formed of an organic insulating material and has a flat surface. The first passivation layer may be omitted.

A common electrode (not shown) is formed on the second passivation layer. The common electrode is formed over the entire surface of the substrate and has a first opening 372a and a second opening 372b. The first opening 372a corresponds to the drain electrode 356 of one pixel region, and the second opening 372b corresponds to the drain electrodes 356 of other two pixel regions adjacent to each other.

In the meantime, the second passivation layer has a depressed portion (not shown) corresponding to the second openings 372b of the common electrode.

Common lines 374 are formed on the common electrode and contact the common electrode. Each common line 374 includes first, second, third and fourth parts 374a, 374b, 374c and 374d. The first part 374a is disposed over one thin film transistor T and corresponds to a first column spacer 392. The second part 374b is disposed over another thin film transistor T and corresponds to a second column spacer 394. The third part 374c extends from each of first and second ends of the second opening 372b of the common electrode 372 corresponding to the drain electrodes 356 of the other two pixel regions adjacent to each other, i.e., upper and lower ends of the depressed portion of the second passivation layer along the second direction by a predetermined length. The third part 374c overlaps the data line 352 between the drain electrodes of the other two pixel regions adjacent to each other. The third part 374c corresponds to a third column spacer 396. The length of the third part 374c may be about 25 micrometers. The fourth part 374d extends along the first direction. The fourth part 374d may include a first line pattern, which connects first ends of the first part 374a and the second part 374b, and a second line pattern, which is parallel to the first line pattern and connects second ends of the first part 374a and the second part 374b. The common lines 374 are formed of a metallic material having relatively low resistivity.

Here, the first column spacer 392 is a gap-forming spacer and has a circular shape in a flat structure. The second column spacer 394 is a press-preventing spacer and has a circular shape in a flat structure. The third column spacer 396 is a latch spacer and has a rectangular shape in a flat structure. A width and a length of the third column spacer 396 are larger than diameters of the first and second column spacers 392 and 394. The first and second column spacers 392 and 394 may have a rectangular shape in a flat structure.

The diameter of the first column spacer 392 is smaller than lengths of the first part 374a along the first and second directions, and edges of the first column spacer 392 are disposed within edges of the first part 374a. The diameter of the second column spacer 394 is smaller than lengths of the second part 374b along the first and second directions, and edges of the second column spacer 394 are disposed within edges of the second part 374b.

Meanwhile, the length of the third column spacer 396 along the first direction is larger than half a length of the pixel region along the first direction and smaller than the length of the pixel region along the first direction. The third column spacer 396 overlaps the data line 352 between the drain electrodes 356 of the other two pixel regions adjacent to each other. At this time, one of adjacent third column spacers 396 may be disposed such that its center is shifted to the right relatively with respect to a corresponding data line 352. The other of the adjacent third column spacers 396 may be disposed such that its center is shifted to the left relatively with respect to a corresponding data line 352.

A third passivation layer (not shown) is formed on the common lines 374. The third passivation layer is formed of an inorganic insulating material, such as silicon oxide or silicon nitride, and has a step height at its top surface due to the lower layer, that is, the common lines 374. Also, the third passivation layer has drain contact holes 380a to expose the drain electrodes 356 with the first passivation layer and the second passivation layer. The drain contact holes 380a are disposed in the first opening 372a or the second opening 372b of the common electrode.

A pixel electrode 382 is formed in each pixel region on the third passivation layer. The pixel electrode 382 includes a plurality of electrode patterns extending along the second direction and spaced apart from each other along the first direction. The pixel electrode 382 contacts the drain electrode 356 through the drain contact hole 380a in each pixel region.

The pixel electrode 382 is inclined with respect to the gate lines 322 with a predetermined angle and has at least one bent part at its center portion. As shown in FIG. 10, the pixel electrode 382 may have a first bent part and second and third bent parts located at both sides of the first bent part. Accordingly, the data lines 352 are also inclined with respect to the gate lines 322 with the predetermined angle and have bent parts in correspondence to the individual pixel regions in parallel to the pixel electrode 382.

An alignment layer (not shown) is formed on the pixel electrode 382, and the alignment layer may be rubbed along the second direction. The alignment layer is formed over a substantially entire surface of the substrate. Accordingly, the alignment layer may be formed on the third passivation layer corresponding to the common lines 374.

Meanwhile, the common lines according to another embodiment of the present invention may have various structures and may have the similar structures to those shown in FIGS. 7A to 7D.

Figure 11:
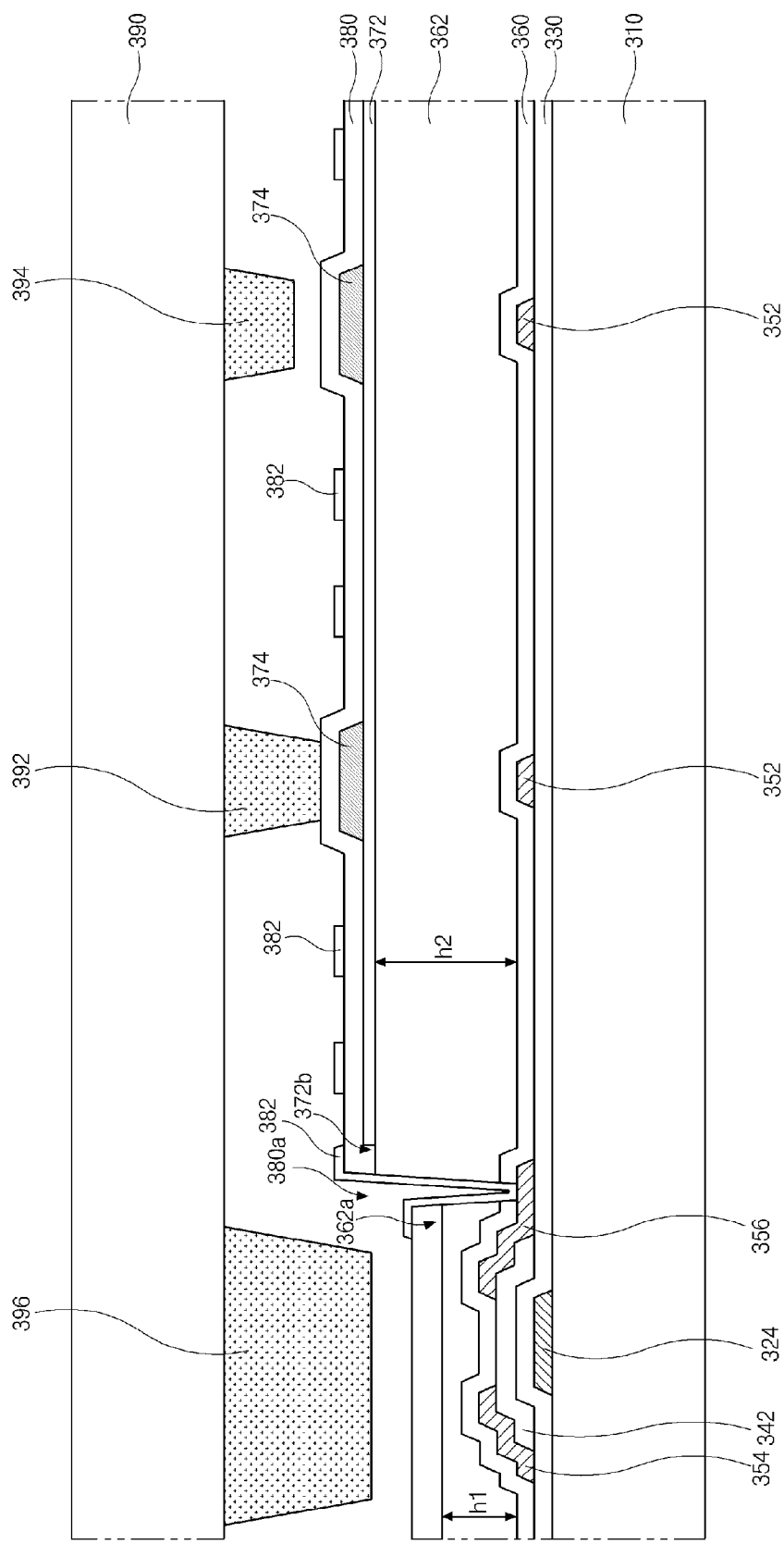
FIG. 11 is a cross-sectional view of schematically illustrating an array substrate for a liquid crystal display device according to another embodiment of the present invention.

FIG. 11 is a cross-sectional view of schematically illustrating an array substrate for a liquid crystal display device according to another embodiment of the present invention.

In FIG. 11, a gate electrode 324 is formed on a first substrate 310. Although not shown in the figure, a gate line 322 of FIG. 10 is formed on the first substrate 310, and the gate line 322 contacts the gate electrode 324 and extends from a first direction. The gate line 322 and the gate electrode 324 are formed of a metallic material having relatively low resistivity.

A gate insulating layer 330 is formed on the gate line 322 and the gate electrode 324. The gate insulating layer 330 is formed of an inorganic insulating material such as silicon nitride or silicon oxide.

An active layer 342 is formed on the gate insulating layer 330 over the gate electrode 324. The active layer 342 is formed of intrinsic amorphous silicon.

Source and drain electrodes 354 and 356 are formed on the active layer 342. The source and drain electrodes 354 and 356 are spaced apart from each other over the gate electrode 324. Data lines 252 are formed on the gate insulating layer 330. The data line 352 is connected to the source electrode 354 and extends along a second direction. The data line 352 crosses the gate line 322 of FIG. 10 to define a pixel region. The data line 352, the source electrode 354 and the drain electrode 356 are formed of a metallic material having relatively low resistivity.

Meanwhile, ohmic contact layers (not shown) of impurity-doped amorphous silicon are formed between the active layer 342 and the source electrode 354 and between the active layer 342 and the drain electrode 356.

Here, the gate electrode 324, the active layer 342, the source electrode 354 and the drain electrode 356 constitute a thin film transistor, and a structure of the thin film transistor is not limited to that shown in FIG. 11.

A first passivation layer 360 is formed on the data line 352, the source electrode 354 and the drain electrode 356, and a second passivation layer 362 for planarization is formed on the first passivation layer 360. The first passivation layer 360 is formed of an inorganic insulating material such as silicon nitride or silicon oxide. The second passivation layer 362 is formed of an organic insulating material such as photo acryl and has a flat top surface. Here, the first passivation layer 360 may be omitted.

The second passivation layer 362 has a depressed portion 362a over the thin film transistor. Actually, the depressed portion 362a corresponds to thin film transistors of two pixel regions adjacent to each other. The second passivation layer 362 has a first height h1 corresponding to the thin film transistor due to the depressed portion 362a and a second height h2 corresponding to the pixel region. The second height h2 is larger than the first height h1. Beneficially, a difference between the first height h1 and the second height h2 is about 1 micrometer. For example, the first height h1 may be about 1 micrometer, and the second height h2 may be about 2 micrometers.

The depressed portion 362a may be formed using a mask that includes slits or a half transmissive layer. Namely, if the second passivation layer 362 is formed of an organic insulating material having a photosensitive property, an organic insulating layer is formed on the first substrate 310, and a mask including a light-transmitting portion, a light-blocking portion and a half light-transmitting portion is disposed over the organic insulating layer. When the organic insulating layer has a positive photosensitive property in which a portion exposed to light is removed after developing, the light-transmitting portion corresponds to the pixel region, and the half light-transmitting portion corresponds to a second opening 372b of a common electrode 372. On the other hand, when the organic insulating layer has a negative photosensitive property in which a portion exposed to light remains after developing, the light-blocking portion corresponds to the pixel region, and the half light-transmitting portion corresponds to the second opening 372b of the common electrode 372. Then, the organic insulating layer exposed to light is developed, thereby forming the second passivation layer 362 that includes the depressed portion 362a corresponding to the second opening 372b of the common electrode 372 and has different heights h1 and h2.

If the second passivation layer 362 does not have a photosensitive property, a photoresist layer is formed on an organic insulating layer, and the organic insulating layer is patterned using the photoresist layer, thereby forming the second passivation layer 362.

The common electrode 372 is formed on the second passivation layer 362 all over the first substrate 310. The common electrode 372 is formed of a transparent conductive material such as indium tin oxide or indium zinc oxide and has the second opening 372b in correspondence to the depressed portion 362a. Although not shown in FIG. 11, the common electrode 372 has a first opening 372a of FIG. 10 corresponding to another drain electrode 356.

A plurality of common lines 374 are formed on the common electrode 372. The common lines 374 may have a single-layered structure or a double-layered structure selected from copper (Cu), copper alloy, or molybdenum and titanium (MoTi). Here, the common lines 374 correspond to the third parts 374c of FIG. 10, which are located over the data lines 352.

A third passivation layer 380 is formed on the common lines 374. The third passivation layer 380 has a drain contact hole 380a exposing the drain electrode 356 with the first and second passivation layers 360 and 362. The drain contact hole 380a is disposed within the second opening 372b. The third passivation layer 380 is formed of an inorganic insulating material such as silicon nitride or silicon oxide and has a step height at its top surface due to the common lines 374.

A pixel electrode 382 is formed in the pixel region on the third passivation layer 380. The pixel electrode 382 is formed of a transparent conductive material such as indium tin oxide or indium zinc oxide. The pixel electrode 382 includes a plurality of electrode patterns spaced apart from each other and overlapping the common electrode 372.

Although not shown in the figures, a first alignment layer is formed on the pixel electrodes 382. The first alignment layer is formed over a substantially entire surface of the first substrate 310. Accordingly, the first alignment layer may be formed on the third passivation layer 380 corresponding to the common lines 374.

In the meantime, a second substrate 390 is spaced apart from the first substrate 310, and a first column spacer 392, a second column spacer 394 and a third column spacer 396 are formed on an inner surface of the second substrate 390. The first column spacer 392 and the second column spacer 394 are located in correspondence to the common lines 374. As stated above, the common lines 374 of FIG. 11 corresponds to the third part 374c of FIG. 10, the first column spacer 392 corresponds to the first part 374a of FIG. 10, and the second column spacer 394 corresponds to the second part 374b of FIG. 10. However, for convenience of explanation, the first and second column spacers 392 and 394 are disposed over the third parts 374c of FIG. 10.

A height of the first column spacer 392 is larger than a height of the second column spacer 394, and a width and a length of the first column spacer 392 are equal to or smaller than a width and a length of the second column spacer 394. Here, the first column spacer 392 contacts the third passivation layer 380 on a common line 374, and the second column spacer 394 is spaced apart from the third passivation layer 380 on another common line 374.

In the meantime, the third column spacer 396 corresponds to the second opening 372b of the common electrode 372 and the depressed portion 362a of the second passivation layer 362. A bottom surface of the third column spacer 396 is disposed in a space on the depressed portion 362a which is in height between the top surface of the depressed portion 362a and the top surface of the third passivation layer 380. A width and a length of the third column spacer 396 are larger than the widths and the lengths of the first and second column spacers 392 and 394.

A height of the third column spacer 396 is substantially equal to the height of the first column spacer 392, and the first column spacer 392 may have a smaller height than the third column spacer 396 when the first column spacer 392 is pressed by the first and second substrates 310 and 390. The first, second and third column spacers 392, 394 and 396 may be formed through one mask process using a mask that includes slits or a half transmissive layer.

Although not shown in the figures, a black matrix, a color filter layer, and an overcoat layer are formed between the second substrate 390 and the first, second and third column spacers 392, 394 and 396.

Meanwhile, a second alignment layer (not shown) is formed between the overcoat layer and the first, second and third column spacers 392, 394 and 396 or on the first, second and third column spacers 392, 394 and 396. In addition, a liquid crystal layer (not shown) is disposed between the first alignment layer and the second alignment layer.

The difference between the first height h1 and the second height h2 of the second passivation layer 362, i.e., a depth of the depressed portion 362a needs to be larger than maximum shrinkage of the third column spacer 396 and may be more than 6000 Å, for example. As stated above, the depth of the depressed portion 362a, beneficially, is about 1 micrometer, and is not limited to this.

Figure 12:
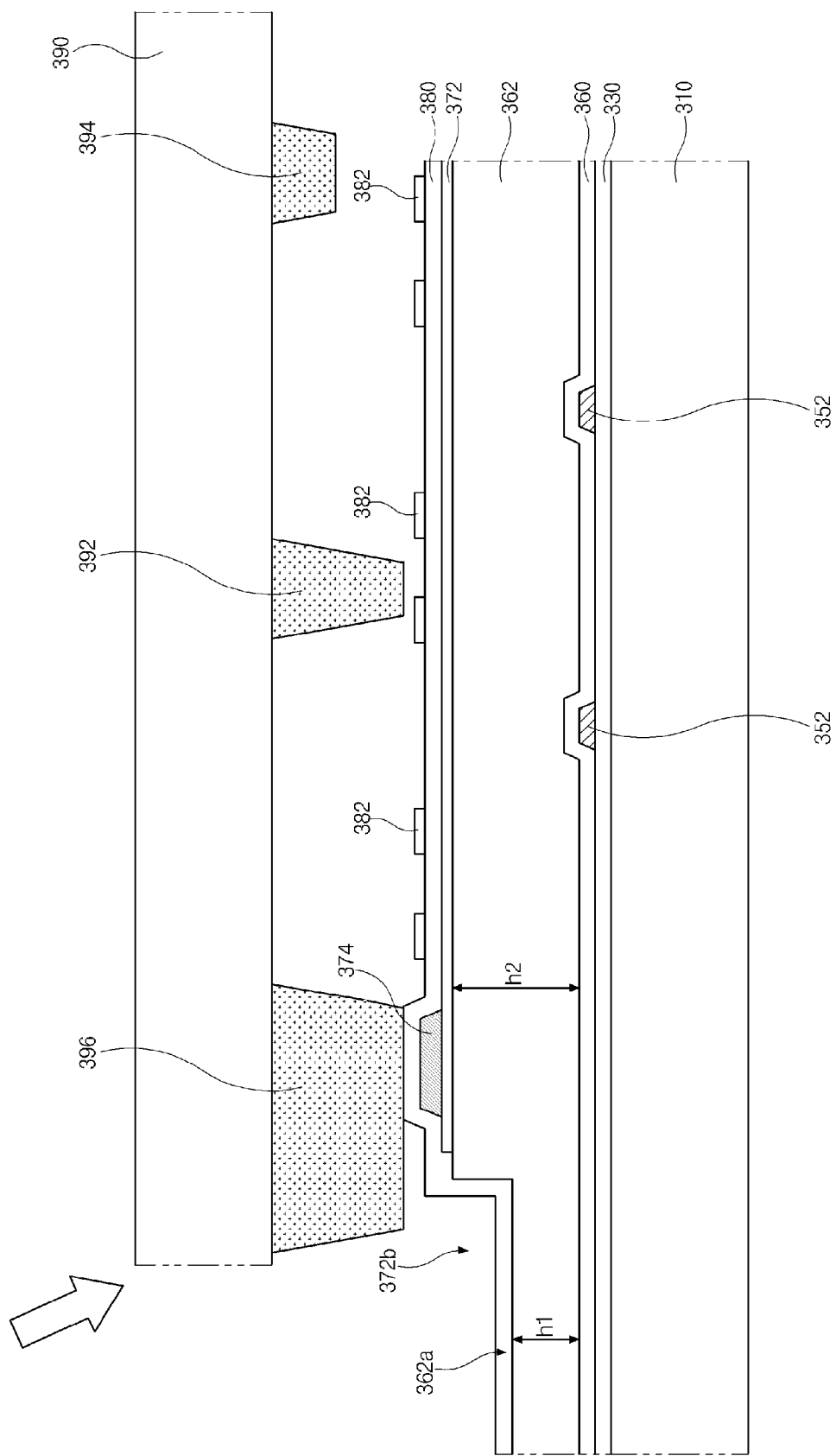
FIG. 12 is a cross-sectional view of schematically illustrating a liquid crystal display device according to another embodiment of the present invention after an external force is applied.

FIG. 12 is a cross-sectional view of schematically illustrating a liquid crystal display device according to another embodiment of the present invention after an external force is applied. FIG. 12 shows pixel regions disposed along the first direction in FIG. 10.

As shown in FIG. 12, when an external force represented by an arrow is applied to the liquid crystal display device according to another embodiment of the present invention in the context of the figure, the second substrate 390 moves to the right relatively with respect to the first substrate 310. Here, the second substrate 390 may move up or down with respect to the first substrate 310 in the context of FIG. 10. At this time, the first, second and third column spacers 392, 394 and 396 on the second substrate 390 move together with the second substrate 390. When the external force is more than a predetermined value, the third column spacer 396 is out of the space on the depressed portion 362a which is in height between the top surface of the depressed portion 362a and the top surface of the third passivation layer 380, and the third column spacer 396 contacts and is supported by the third passivation layer 380 on the common line 374 adjacent to the third column spacer 396, that is, the third part 374c of FIG. 10. Actually, the third column spacer 396 contacts and is supported by the first alignment layer. Accordingly, the first and second column spacers 392 and 394 are prevented from contacting the alignment layer in the pixel region.

As mentioned above, the height of the third column spacer 396 is substantially equal to the height of the first column spacer 392, and the height of the second column spacer 394 is smaller than the heights of the first and third column spacers 392 and 396.

In the meantime, although not shown in the figures, when the external force is less than the predetermined value, the third column spacer 396 may not be out of the space on the depressed portion 362a which is in height between the top surface of the depressed portion 362a and the top surface of the third passivation layer 380, and a side wall of the third column spacer 396 may contact a side wall of the depressed portion 362a, more particularly, the third passivation layer 380 or a side wall of the pixel electrode 382 on the side wall of the depressed portion 362a. Therefore, the second substrate 390 is prevented from moving.

If an arrangement density of the third column spacer 396 is too low, when the external force is applied, the third column spacer 396 cannot be supported by the third passivation layer 380 on the common line 374. If the arrangement density of the third column spacer 396 is too high, rubbing problems may be caused. Accordingly, it is beneficial that the third column spacer 396 has an appropriate arrangement density such that problems are minimized.

In another embodiment of the present invention, the liquid crystal display device includes the third column spacer 396, and the second passivation layer 362 has the depressed portion 362a corresponding to the third column spacer 396 such that the third column spacer 396 does not contact layers over the first substrate 310. A contact area of the first, second and third column spacers 392, 394 and 396 with the layers on the first substrate 310 decreases, and a margin for liquid crystal is optimized. In addition, when the first, second and third column spacers 392, 394 and 396 move, the third column spacer 396 contacts the third passivation layer 380 on the common line 374, so that the first and second column spacers 392 and 394 are prevented from contacting the third passivation layer 380.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A liquid crystal display device comprising:
   a first substrate and a second substrate facing each other;
   wherein the first substrate comprises:
     a plurality of gate lines over the first substrate along a first direction;
     a plurality of data lines over the first substrate along a second direction and crossing the gate lines to define pixel regions;
     a thin film transistor at each crossing portion of the plurality of gate lines and the plurality of data lines;
     an insulating layer covering the thin film transistor and having a flat top surface;
     a common electrode on the insulating layer all over the first substrate;
     a plurality of common lines on the common electrode;
     a passivation layer on the common lines; and a pixel electrode on the passivation layer in each pixel region and connected to the thin film transistor, the pixel electrode including electrode patterns, wherein the passivation layer has a step height at a top surface of the passivation layer due to the plurality of common lines, wherein the second substrate comprises:
a black matrix, a color filter layer, and an overcoat layer stacked up on the second substrate;
a first spacer and a second spacer on the overcoat layer.

2. The liquid crystal display device of claim 1, wherein each of the common lines includes a first part corresponding to one thin film transistor and a second part corresponding to another thin film transistor.

3. The liquid crystal display device of claim 2, wherein each of the common lines further includes a third part extending from the second part along the second direction by a predetermined length.

4. The liquid crystal display device of claim 3, wherein the predetermined length is less than half of a length of the pixel region along the second direction.

5. The liquid crystal display device of claim 3, wherein the third part overlaps one of the plurality of data lines.

6. The liquid crystal display device of claim 2, wherein the second substrate further comprises a third spacer, and a height from a top surface to a bottom surface of the third spacer is equal to a height from a top surface to a bottom surface of the first spacer.

7. The liquid crystal display device of claim 6, wherein the insulating layer has a depressed portion corresponding to thin film transistors of two pixel regions adjacent to each other, and the third spacer is disposed in a space on the depressed portion which is in height between a top surface of the depressed portion and the top surface of the passivation layer.

8. The liquid crystal display device of claim 7, wherein each of the common lines further includes a third part that extends from an area corresponding to each of upper and lower ends of the depressed portion.

9. The liquid crystal display device of claim 7, wherein the common electrode includes an opening corresponding to the depressed portion.

10. The liquid crystal display device of claim 2, wherein each of the plurality of common lines further includes a third part extending along the first direction and including a first line pattern, which connects first ends of the first part and the second part, or a second line pattern, which connects second ends of the first part and the second part.

11. The liquid crystal display device of claim 10, wherein each of the plurality of common lines further includes a fourth part extending from the second part along the second direction by a predetermined length, and the third part connects the second ends of the first and second parts, wherein one of adjacent fourth parts along the second direction extends from the first end of the second part and the other of the adjacent fourth parts along the second direction extends from the second end of a next second part.

12. The liquid crystal display device of claim 2, wherein the second part includes two patterns corresponding to other two thin film transistors adjacent to each other, respectively, and the second spacer overlaps each pattern of the second part.

13. The liquid crystal display device of claim 12, wherein a center line of one second spacer of two adjacent second spacers is disposed on the right with respect to a center line of a common line corresponding to this second spacer, and a center line of another second spacer of the two adjacent second spacers is disposed on the left with respect to a center line of a common line corresponding to said another second spacer.

14. The liquid crystal display device of claim 1, wherein each second spacer has a length that covers the plurality of common lines over the plurality of data lines and the pixel region among the plurality of data lines.

15. The liquid crystal display device of claim 14, wherein each second spacer has a length that covers the plurality of common lines over two adjacent data lines and the pixel region among the two adjacent data lines.

16. The liquid crystal display device of claim 1, wherein the plurality of data lines are inclined with respect to the plurality of gate lines with a predetermined angle.

17. The liquid crystal display device of claim 1, wherein a height from a top surface to a bottom surface of the first spacer is higher than a height from a top surface to a bottom surface of the second spacer, and the top surface of the first spacer contacts a top layer over the first substrate such that a gap between the first substrate and the second substrate is uniformly maintained.

18. The liquid crystal display device of claim 17, wherein the first spacer has a circular shape in a flat structure and the second spacer has a rectangular shape in a flat structure.

19. An array substrate for a liquid crystal display device comprising:
a plurality of gate lines over a substrate along a first direction;
a plurality of data lines over the substrate along a second direction and crossing the gate lines to define pixel regions;
a thin film transistor at each crossing portion of the plurality of gate lines and the plurality of data lines;
an insulating layer covering the thin film transistor and having a flat top surface;
a common electrode on the insulating layer all over the substrate;
a plurality of common lines on the common electrode;
a passivation layer on the common lines; and
a pixel electrode on the passivation layer in each pixel region and connected to the thin film transistor, the pixel electrode including electrode patterns,
wherein the passivation layer has a step height at a top surface of the passivation layer due to the plurality of common lines.

20. The array substrate of claim 19, wherein each of the common lines includes a first part corresponding to one thin film transistor and a second part corresponding to another thin film transistor.

21. The array substrate of claim 20, wherein each of the common lines includes a third part extending from the second part along the second direction by a predetermined length.

22. The array substrate of claim 21, wherein the predetermined length is less than half of a length of the pixel region along the second direction.

23. The array substrate of claim 21, wherein the third part overlaps one of the plurality of data lines.

24. The array substrate of claim 20, wherein each of the plurality of common lines further includes a third part that extends along the first direction and including a first line pattern, which connects first ends of the first part and the second part, or a second line pattern, which connects second ends of the first part and the second part.

25. The array substrate of claim 24, wherein each of the plurality of common lines further includes a fourth part extending from the second part along the second direction by a predetermined length, and the third part connects the second ends of the first and second parts, wherein one of adjacent fourth parts along the second direction extends from the first end of the second part and the other of the adjacent fourth parts along the second direction extends from the second end of a next second part.

26. The array substrate of claim 20, wherein the insulating layer has a depressed portion corresponding to thin film transistors of two pixel regions adjacent to each other.

27. The array substrate of claim 26, wherein each of the common lines further includes a third part that extends from an area corresponding to each of upper and lower ends of the depressed portion.

28. The array substrate of claim 26, wherein the common electrode includes an opening corresponding to the depressed portion.

29. The array substrate of claim 19, wherein the plurality of data lines are inclined with respect to the plurality of gate lines with a predetermined angle.

* * * * *